US007364791B2

(12) United States Patent
Shimamura et al.

(10) Patent No.: US 7,364,791 B2
(45) Date of Patent: Apr. 29, 2008

(54) DEVELOPER CARRYING MEMBER AND DEVELOPING METHOD BY USING THEREOF

(75) Inventors: Masayoshi Shimamura, Kanagawa (JP); Kenji Fujishima, Kanagawa (JP); Naoki Okamoto, Shizuoka (JP); Yasutaka Akashi, Kanagawa (JP); Satoshi Otake, Shizuoka (JP); Kazunori Saiki, Kanagawa (JP); Yasuhide Goseki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/564,336

(22) Filed: Nov. 29, 2006

(65) Prior Publication Data

US 2007/0092702 A1 Apr. 26, 2007

Related U.S. Application Data

(62) Division of application No. 10/853,311, filed on May 26, 2004, now Pat. No. 7,223,511.

(30) Foreign Application Priority Data

Sep. 2, 2003 (JP) ............................ 2003-309530

(51) Int. Cl.
*B32B 5/16* (2006.01)

(52) U.S. Cl. ...................... 428/323; 428/327; 428/403; 428/325; 430/123.3

(58) Field of Classification Search ................ 428/323, 428/327, 403, 325; 399/222, 262, 319; 430/120, 430/123.3
See application file for complete search history.

(56) References Cited

U.S. PATENT DOCUMENTS 4,989,044 A 1/1991 Nishimura et al. ......... 355/251
5,175,070 A 12/1992 Tanikawa et al. ........... 430/122
5,175,586 A 12/1992 Goseki et al. .............. 355/259
5,202,731 A 4/1993 Tanikawa et al. ........... 355/251
5,240,803 A 8/1993 Ota ............................ 430/106
5,547,724 A 8/1996 Kuribayashi ............... 428/35.8

(Continued)

FOREIGN PATENT DOCUMENTS

CN 1172276 2/1998

(Continued)

*Primary Examiner*—Christopher RoDee
(74) *Attorney, Agent, or Firm*—Fitzpatrick, Cella, Harper & Scinto

(57) ABSTRACT

The present invention relates to a developer carrying member for carrying a developer having at least a substrate and a resin-coated layer formed on the surface of the substrate. The developer carrying member is the one which carries a one-component developer to visualize the electrostatic latent image carried by the electrostatic latent image carrying member, the resin-coated layer contains at least a binder resin, graphitized particles and roughing particles, the graphitized particles has 0.20 to 0.95 of graphitization degree (p (002)), and wherein in the surface configuration of the resin-coated layer as measured by use of focusing optical laser, the volume (B) of a microtopographical region defined by a certain area (A) of the microtopographical region without convexity formed by the roughing particles meets the following relationship $4.5 \leqq B/A \leqq 6.5$, and the resin-coated layer has 0.9 to 2.5 μm of arithmetic mean roughness (Ra).

3 Claims, 3 Drawing Sheets

U.S. PATENT DOCUMENTS

| | | | | |
|---|---|---|---|---|
| 5,700,616 | A | 12/1997 | Kasuya et al. | 430/126 |
| 5,860,050 | A | 1/1999 | Shimamura et al. | 399/276 |
| 5,912,101 | A | 6/1999 | Karaki et al. | 430/110 |
| 5,998,008 | A | 12/1999 | Shimamura et al. | 428/323 |
| 6,033,817 | A | 3/2000 | Yusa et al. | 430/106.6 |
| 6,115,575 | A | 9/2000 | Kinoshita et al. | 399/286 |
| 6,122,473 | A | 9/2000 | Goseki et al. | 399/286 |
| 6,391,511 | B1 | 5/2002 | Okamoto et al. | 430/120 |
| 6,687,476 | B2 | 2/2004 | Goseki et al. | 399/109 |
| 6,841,327 | B2 | 1/2005 | Otake et al. | 430/120 |
| 2002/0027066 | A1 | 3/2002 | Kanno et al. | 201/1 |
| 2002/0142243 | A1 | 10/2002 | Hirose et al. | 430/110.3 |
| 2003/0013588 | A1 | 1/2003 | Naka | |
| 2003/0123909 | A1 | 7/2003 | Akashi et al. | 399/286 |

FOREIGN PATENT DOCUMENTS

| | | | |
|---|---|---|---|
| CN | 1416028 | A | 5/2003 |
| EP | 0 421 331 | A2 | 4/1991 |
| EP | 1 308 796 | A2 | 5/2003 |
| JP | 1-276174 | | 11/1989 |
| JP | 2-87157 | | 3/1990 |
| JP | 3-84558 | | 4/1991 |
| JP | 3-200986 | | 9/1991 |
| JP | 3-229268 | | 10/1991 |
| JP | 4-1766 | | 1/1992 |
| JP | 4-102862 | | 4/1992 |
| JP | 8-240981 | | 9/1996 |
| JP | 10-97095 | | 4/1998 |
| JP | 11-149176 | | 6/1999 |
| JP | 11-202557 | | 7/1999 |

DEVELOPER CARRYING MEMBER AND DEVELOPING METHOD BY USING THEREOF

CROSS-REFERENCE TO RELATED APPLICATION

This application is a divisional of application Ser. No. 10/853,311 filed May 26, 2004, which issued as U.S. Pat. No. 7,223,511 on May 29, 2007.

BACKGROUND OF THE INVENTION

1. Field of the Invention

The present invention relates to a developer carrying member used in a developing apparatus to form a toner image by developing an electrostatic latent image formed on the image carrying member such as an electrophotographic photosensitive member or electrostatic recording dielectric. The invention also relates to a developing method using the above described developer carrying member.

2. Related Background Art

Electrophotography conventionally forms an electrostatic latent image on the support thereof (photosensitive drum) by various measures using a photoconductive material, then develops the electrostatic latent image by a developer (toner) to form the toner image and transfer the toner image on a transfer material, such as paper, if appropriate, followed by fixation of the toner image on the transfer material by application of heat, pressure or both heat and pressure to obtain the print or copy.

Developing systems in the electrophotography are principally classified into the one-component and two-component developing systems. Recently, since there are needs of miniaturization of the developing apparatus part aiming at a lightweight and miniaturized electrophotographic apparatus, the one-component developing system is often used.

Since the one-component developing system does not require the carrier particles as the two-component developing system does, the developing apparatus itself can be miniaturized and light. On the other hand, the two-component developing system requires the constant toner density to be kept in the developer, therefore needed is the apparatus for detecting the toner density and supplying the needed amount of toner, accordingly, the developing apparatus will be larger and heavier. Since the one-component developing system does not need such an apparatus, it can be smaller and lighter.

In the developing apparatus using the one-component developing system, the electrostatic latent image is formed on the surface of the photosensitive drum as a carrying member of the electrostatic latent image, and provide the toner with positive or negative friction charge through friction between the developer carrying member carrying member (developing sleeve) and toner and/or friction between the member regulating the thickness of the developer layer and toner. Then the toner electrified is applied thin on the developing sleeve which is conveyed to the developing region where the photosensitive drum is opposed to the developing sleeve. In the developing region, the toner is attached to the electrostatic latent image on the surface of the photosensitive drum to develop and form the toner image.

When using such a one-component developing system, homogenized toner charge and sufficient endurance stability are needed.

Particularly, the charge-up phenomenon is likely to occur particularly under low humidity where the charge amount of the toner coated on the developing sleeve becomes excessively high owing to the contact with the developing sleeve during repeated rotation of the developing sleeve, resulting in immobilization of the toner on the developing sleeve by drawing between the toner and the reflection force on the developing sleeve failing in transfer of the toner from the developing sleeve to the electrostatic latent image on the photosensitive drum that is charge-up phenomenon. When the charge-up phenomenon occurs, it becomes difficult for the toner in the upper layer to charge resulting in reduction of developing amount of the toner. Consequently, there sometimes occur problems such as thinning of the line image and lowering of image density of the solid image. Further, the toner which has failed in appropriate charging owing to the charge-up phenomenon may flow on the developing sleeve off the control to make spotty or wavy unevenness that is the blotching phenomenon.

Furthermore, a sleeve ghost phenomenon, indicating a visible trace of solid image likely to occur on the image when the position where the solid image once developed with high image density on the developing sleeve comes to the developing position at the following rotation of the developing sleeve to develop the half-tone image.

Recently, reduction of the particles size and fine-granulation of the toner have been attempted for digitization of the electrophotography apparatus and for higher image quality. For example, the toner which has about 5 to 12 μm of the weight average particles size is used in general in order to enhance the resolution and sharpness of letters reproducing the constant electrostatic latent image.

Further, in view of saving energy and space of office, miniaturization of the printer is required. Consequently, miniaturization of the container storing the toner in the printer is also required and the low consumption toner which enables printing out a large number of sheets by small amount of the toner should be used. As a low consumption toner, the toner wherein the form of the toner particles is approximated spherical has been used.

Furthermore, the tendency is decrease of a fixation temperature for the purpose of time reduction for fast copying and saving electric power.

In such situations, the toner, particularly under a low temperature and low humidity is more likely to attach electrostatistically on the developing sleeve because of increased charge per unit weight, while under high temperature and high humidity, blotching and melt-adhesion by the toner are likely to occur on the developing sleeve.

As a method to solve such phenomena, in publication of Japanese Patent Application Laid-Open No. 1-276174, proposed is using in the developing apparatus a developing sleeve wherein a resin-coated layer with an electroconductive fine powder such as crystalline graphite or carbon dispersed in the resin is set on a metal substrate. By using this developing sleeve, substantial reduction of the above phenomena is noted.

In this developing sleeve, however, when adding much amount of electroconductive fine powder, appropriate electrification to the toner is decreased leading to difficulty of obtaining high image density particularly in the environment of high temperature and high humidity, though the case is good for charge-up and sleeve ghost. Further, when adding much amount of electroconductive fine powder, the resin-coated layer becomes friable being easy to be scraped as well as configuration of the surface is likely to be uneven, and when advancing endurance for a large number of sheets, surface roughness and surface composition of the resin-coated layer is altered resulting in frequent occurrence of poor conveyance of the toner and inhomogeneous electrification to the toner.

In publication of Japanese Patent Application Laid-Open No. 1-276174, proposed is a developing apparatus having a developing sleeve which uses a coated layer with crystalline graphite particles dispersed. The crystalline graphite particles used there are those comprised of artificial graphite, which is obtained by burning a shaped aggregate, such as coke bound by tar pitch at about 1,000 to 1,300° C., and then graphitizing it at about 2,500 to 3,000° C., or natural graphite. Accordingly, the crystalline graphite has lubricity caused by the scaly structure which exerts effect against charge-up and sleeve ghost. However, the crystalline graphite particles are scaly and indeterminate in shape, and in addition, when they are dispersed in the resin-coated layer, it is difficult for the particles to be smaller and dispersed evenly, resulting in an uneven surface of the resin-coated layer. Such an uneven surface formed by the crystalline graphite may cause melt-adhesion of the toner thereto.

Further, owing to the low hardness of the above crystalline graphite, abrasion and elimination of the crystalline graphite particles themselves are likely to occur on the surface of the resin-coated layer. Accordingly, the surface roughness and surface composition of the resin-coated layer are likely to change when advancing endurance for a large number of sheets which leads to frequent occurrence of the toner melt-adhesion, consequently, poor conveyance of the toner and inhomogeneous electrification to the toner are likely to occur. On the other hand, when adding small amount of electroconductive fine powder such as carbon to the resin-coated layer formed on the metal substrate of the developing sleeve, the effect of the crystalline graphite particles and electroconductive fine powder is weak, accordingly, charge-up and sleeve ghost may occur.

In publication of Japanese Patent Application Laid-Open No. 3-200986, proposed is a developing apparatus having a developing sleeve wherein on the metal substrate, electrically conductive resin-coated layer is set with electroconductive fine powder such as crystalline graphite and carbon dispersed in the resin. In this developing sleeve, abrasion resistance of the resin-coated layer is improved as well as the surface of the resin-coated layer is made more even, leading to a relatively little change in surface roughness caused by a large number of sheet transfers, which in turn stabilize more the state of the toner coated on the developing sleeve and makes the charge of the toner more uniform. Consequently, problems including sleeve ghost, image density and unevenness of the image density are reduced and the image quality tends to be steadier. Even in this developing sleeve, however, a rapid control for homogeneous charge and stabilization of appropriate electrification to the toner should be preferably improved further more. In addition, for abrasion resistance, change of surface roughness and unevenness of roughness of the resin-coated layer caused by abrasion and elimination of spherical particles or crystalline graphite of the resin in the developing sleeve during use of longer period as well as accompanying toner blotting and toner melt-adhesion of the resin-coated layer are likely to occur. These cases make toner charge unstable often causing poor image including reduction of image density, unevenness of density, fogging and image streaks.

In publication of Japanese Patent Application Laid-Open No. 8-240981, proposed is a developing apparatus having the developing sleeve wherein homogeneous electrification to the toner is improved by homogenizing abrasion resistance and conductivity of the surface of the resin-coated layer caused by homogeneous dispersion of electroconductive spherical particles in the electroconductive resin-coated layer owing to that the spherical particles dispersed in the electroconductive resin-coated layer have lower specific gravity and electroconductivity as well as toner blotting and toner melt-adhesion can be controlled even when the resin-coated layer is worn down to some degree. In this developing sleeve, however, there are matters to be improved regarding rapid and homogeneous electrification to the toner and appropriate electrification to the toner. Further, for endurable use for long time, electroconductive particles such as crystalline graphite are likely to be worn down or eliminated because configuration of the part on the surface of the resin-coated layer without the electroconductive spherical particles is uneven as well as abrasion resistance of the above described part is poor. From such parts which have been worn down and eliminated or from parts of uneven configuration, abrasion of the resin-coated layer and toner blotting as well as toner melt-adhesion occurs which often leads to unstable charge of the toner.

In publication of Japanese Patent Application Laid-Open No. 3-84558, publication of Japanese Patent Application Laid-Open No. 3-229268, publication of Japanese Patent Application Laid-Open No. 4-1766 and publication of Japanese Patent Application Laid-Open No. 4-102862, proposed is a toner in spherical form or the form approximated to the spherical. The developing sleeve and developing apparatus effective for reduction of consumption of the toner and stabilization of development of the toner through endurance has been awaited.

In publication of Japanese Patent Application Laid-Open No. 2-87157, publication of Japanese Patent Application Laid-Open No. 10-97095, publication of Japanese Patent Application Laid-Open No. 11-149176 and publication of Japanese Patent Application Laid-Open No. 11-202557, proposed is a toner which the toner particle shape and surface properties are modified by thermal or mechanical impact of the toner particles synthesized by pulverization method. The developing sleeve and developing apparatus effective for reduction of consumption of the toner and stabilization of development of the toner through endurance has been awaited.

SUMMARY OF THE INVENTION

The purpose of the present invention is to provide a developer carrying member and developing method which solve the above problems. The purpose of the present invention is to provide a developer carrying member which is not likely to generate problems including reduction of density, unevenness of image density, image streaks, sleeve ghost and fogging even in the different environment enabling to provide constant high-quality image with high image density and a developing method which uses the above developer carrying member.

Further, the purpose of the present invention is to provide a developer carrying member which can control uneven charge on the toner as well as appropriate and rapid electrification to the toner by means of reduction of toner attachment onto the surface of the developer carrying member and of toner melt-adhesion which appear when the image is formed using the toner with small particles size and high degree of sphericity, and a developing method which uses the above developer carrying member.

Further, the purpose of the present invention is to provide a developer carrying member which does not cause deterioration easily of resin-coated layer on the surface of the developer carrying member during repeated development or endurable use; has high durability; and give constant image quality, and a developing method which uses the above developer carrying member.

Further, the purpose of the present invention is to provide a developer carrying member which gives a high quality image without reduction of image density during endurable use, unevenness of density, sleeve ghost, fogging and image streaks by means of rapid homogeneous and appropriate electrification as well as constant electrification without occurring charge-up, and a developing method which uses the above developer carrying member.

Further, the purpose of the present invention is to provide a developer carrying member for carrying a developer, comprising at least a substrate and a resin-coated layer on the substrate, wherein the above described developer carrying member is the one which carries one component developer to visualize the electrostatic latent image carried by the electrostatic latent image carrying member;

the resin-coated layer contains at least a binder resin, graphitized particles and roughing particles;

the graphitized particles have 0.20 to 0.95 of graphitization degree (p (002)); and wherein in the surface configuration of the resin-coated layer as measured by use of focusing optical laser, the volume (B) of a microtopographical region defined by a certain area (A) of the microtopographical region without convexity formed by the roughing particles meets the following relationship: 4.5≦B/A≦6.5; and the resin-coated layer has 0.9 to 2.5 μm of arithmetic mean roughness (Ra).

Further, the purpose of the present invention is to provide a developing method, comprising:

carrying the one-component developer contained in the developer container onto the developer carrying member lamellarly;

conveying the developer carried by the developer carrying member to the developing region opposed to the electrostatic latent image carrying member;

forming the toner image by developing the electrostatic latent image, which is carried by the electrostatic latent image carrying member, with the conveyed developer, which is a one-component developer; wherein the developer carrying member has at least a substrate and a resin-coated layer formed on the substrate;

the resin-coated layer contains at least a binder resin, graphitized particles and roughing particles;

the graphitized particles have 0.20 to 0.95 of graphitization degree (p (002)); and wherein in the surface configuration of the resin-coated layer as measured by use of focusing optical laser, the volume (B) of a microtopographical region defined by a certain area (A) of the microtopographical region without convexity formed by the roughing particles meets the following relationship: 4.5≦B/A≦6.5; and the resin-coated layer has 0.9 to 2.5 μm of arithmetic mean roughness (Ra).

DESCRIPTION OF THE PREFERRED EMBODIMENTS

Figure 1:
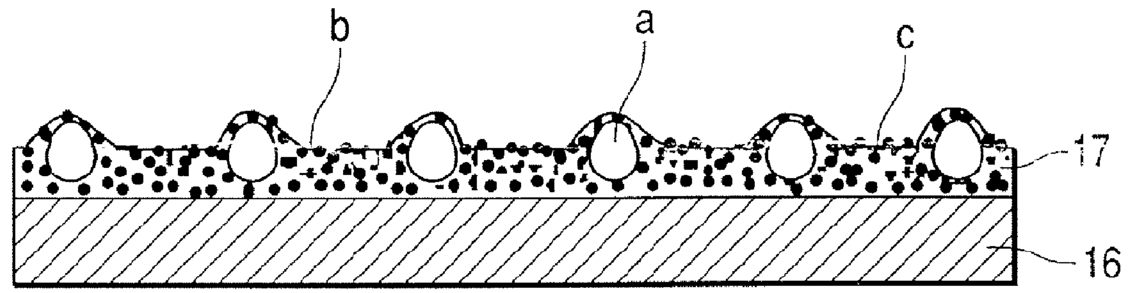
FIG. 1 is a schematic section view showing a part of the developer carrying member of the present invention.

The present invention will be described in detail citing preferred embodiments.

The developer carrying member of the present invention is the one which carries the developer for developing the electrostatic latent image carried on the electrostatic latent image carrying member, and has at least a substrate and a resin-coated layer formed on the substrate. The resin-coated layer of the present invention which carries the developer is characterized in: containing at least graphitized particles which have 0.20 to 0.95 of graphitization degree (p (002)); and wherein in the surface configuration of the resin-coated layer as measured by use of focusing optical laser, the volume (B) of a microtopographical region defined by a certain area (A) of the microtopographical region without convexity formed by the roughing particles meets the following relationship: 4.5≦B/A≦6.5; and arithmetic mean roughness (Ra) is 0.9 to 2.5 μm.

The graphitization degree (p (002)) is the Franklin's p value obtained using the following equation (1) after measuring lattice spacing, d (002) obtained from X-ray diffraction pattern of the graphite:

$$d(002)=3.440-0.086(1-(p(002))^2) \quad (1)$$

This p value shows the ratio of the disordered part in carbon lamination of hexagonally networked planes. The lower the (p (002)) value is, the higher crystallinity of graphitization is.

The graphitized particles used in the present invention differs from the conventional crystalline graphite in the ingredient and manufacturing process. The conventional graphite as described in publication of Japanese Patent Application Laid-Open No. 1-276174 is comprised of artificial graphite obtained by burning at about 1,000 to 1,300° C., then 2,500 to 3,000° C. to make graphite after molding aggregate such as coke hardened by tar pitch or of natural graphite. The graphitized particles used in the present invention has high electrical conductivity and lubricity similarly to the crystalline graphite while degree of graphitization is a little lower than the crystalline graphite. Further, the graphitized particles used in the present invention is characterized in that: configuration of the particles is granular as contrasted with the configuration of the crystalline graphite which is scaly or needle; and hardness of the particles itself is relatively high.

The graphitized particles used in the present invention differs from the spherical particles which have low specific gravity and conductivity as described in Japanese Patent Application Laid-Open No. 8-240981 in the ingredient and manufacturing method. It differs in its properties and the effect on the resin-coated layer.

For the spherical particles which have low specific gravity and conductivity described in Japanese Patent Application Laid-Open No. 8-240981, the surface of the spherical resin particles such as phenol resin, naphthalene resin, furan resin, xylene resin, divinyl benzene polymer, styrene-divinyl benzene copolymer or polyacrylonitrile is coated with bulk mesophase pitch using mechanochemical method, the coated particles is heat-treated under oxidation atmosphere followed by burning under inert atmosphere or under vacuum to be carbonized and/or graphitized. Accordingly, though the surface is graphitized, the inside of the particles is carbonized since the spherical resin particles itself is the material which is difficult to be graphitized. Consequently, graphitization degree (p (002)) of the particles itself is unmeasurable which is different from the graphitized particles used in the present invention in crystallinity. Further, the above electroconductive spherical particles when dispersed in the resin-coated layer, enhance conveyability of the toner, increase occasions of the toner contact as well as it gives function to the resin-coated layer of improving abrasion resistance of the resin-coated layer.

On the other hand, the graphitized particles used in the present invention are added in the resin-coated layer in order to provide the resin-coated layer with characteristics such as homogeneous lubricity, electroconductivity, ability of electrification and abrasion resistance by means of providing a homogeneous microunevenness on the surface of the resin-coated layer.

Since the graphitized particles used in the present invention, are easy to be dispersed homogeneously and minutely in the resin-coated layer, microunevenness formed on the surface of the resin-coated layer by the graphitized particles could be easily controlled to an appropriate size. Formation of the microunevenness on the surface of the resin-coated layer controls the area contacting with the surface of toner to improve releasing property of the toner as well as to make it easy for the toner to be charged homogeneously, and also to make the graphitized particles exert their excellent electrification and more lubricative effect, thereby enabling rapid, homogenous and constant electrification to the toner without occurrence of charge-up of the toner, toner blotching or toner melt-adhesion on the surface of the resin-coated layer.

Further, the difference of hardness between the graphitized particles and the coating resin is small because the graphitized particles itself used in the present invention has excellent lubricity and appropriate hardness, which prevent the surface of the resin-coated layer being scraped for endurance for a large number of sheets. Therefore, even when the surface of the resin-coated layer in the microunevenness portion is scraped, it is likely to be scraped homogeneously so as to maintain the microunevenness. Consequently, composition and properties of the resin-coated layer surface will be prevented from changing for endurance for a large number of sheets.

The graphitized particles used in the invention has 0.20 to 0.95 of graphitization degree (p (002)). The graphitization degree (p (002)) is preferably 0.25 to 0.75, more preferably 0.25 to 0.70.

When the graphitization degree (p (002)) of the graphitized particles exceeds 0.95, abrasion resistance of the resin-coated layer is higher whereas electroconductivity and lubricity decrease, therefore, charge-up of the toner and toner melt-adhesion may occur and lowering of the image quality is likely to occur including sleeve ghost, fogging, low density. Particularly, in the developing process, when using an elastic blade and a toner with high sphericity, streaks and unevenness of density in the image are likely to occur because of toner melt-adhesion on the surface of the developing sleeve. On the other hand, when the graphitization degree (p (002)) of graphitized particles is less than 0.20, reduction of hardness of the graphitized particles causes reduction of abrasion resistance of the surface of the resin-coated layer. Accordingly, the microunevenness provided by the graphitized particles on the surface of the resin-coated layer is difficult to be maintained, further composition of the surface of the resin-coated layer is likely to be changed and consequently, charge-up of the toner and tone melt-adhesion may occur.

The graphitization degree (p (002)) of graphitized particles is obtained from the following equation after measuring the lattice spacing, d (002) obtained from the X-ray diffraction spectrum of the graphitized particles by Mack Science Co., Ltd.-made high power type full-automatic X-ray diffraction apparatus "MXP18" system:

$$d(002)=3.440-0.086(1-(p(002))^2).$$

For the lattice spacing, d (002), CuKα ray is used as the X-ray source while $CuK_\beta$ ray is eliminated by the nickel filter. As the standard reference material, high grade silicon is used and calculation is performed using peak position of C (002) and Si (111) diffraction patterns. Main measurement conditions are as follows:

X-ray generating apparatus: 18 kw
Goniometer: lateral type goniometer
Monochrometer: used
Tube voltage: 30.0 kV
Tube current: 10.0 mA
Measuring method: continuous method
Scan axis: 2θ/θ
Sampling space: 0.020 deg
Scan speed: 6.000 deg/min
Divergent slit: 0.50 deg
Scattering slit: 0.50 deg
Ray receiving slit: 0.30 mm As a method for obtaining the graphitized particles which has 0.20 to 0.95 of the graphitization degree (p (002)), the methods as shown below are preferred, but not limited to those methods.

As a preferred method for obtaining the graphitized particles used in the present invention, the following is preferred so as to enhance the graphitization degree of the graphitized particles and to retain appropriate hardness and dispersibility while maintaining lubricity: graphitization is performed using meso carbon microbeads or bulk mesophase pitch particles as an ingredient which have optical isomerism being comprised of a single phase.

Optical isomerism of the ingredient results from lamination layers of aromatic molecules and its orderedness advances by graphitization to give the graphitized particles which has the high graphitization degree.

When using bulk mesophase pitch as an ingredient for obtaining the graphitized particles used in the invention, the bulk mesophase pitch which soften and fuse under heating is preferably used to obtain the graphitized particles which is particulate, highly dispersible and highly graphitized.

As a method for obtaining the bulk mesophase pitch, there is a method wherein β-resin extracted from the material such as coal tar pitch by solvent fractionation is hydrogenated and subjected to thickening treatment to give the bulk mesophase pitch. Also in the above method, after thickening treatment the bulk mesophase pitch may be obtained by fine grinding followed by removing the fraction soluble in the solvent such as benzene or toluene.

The bulk mesophase pitch has preferably 95% by weight and more of fraction soluble in quinoline. When using the bulk mesophase pitch which has less than 95% by weight of fraction soluble in quinoline, the inside of the bulk mesophase pitch particles is difficult for liquid phase carbonization and solid phase carbonization makes the configuration of the carbonized particles remain broken state. Consequently, configuration of the particles is likely to be uneven resulting in poor dispersion. The method for graphitizing the bulk mesophase pitch obtained as described above will be shown as follows: the bulk mesophase pitch is fine pulverized to 2 to 25 μm. The fine pulverized bulk mesophase pitch is heat-treated at about 200 to 350° C. in the air to undergo mild oxidation. This oxidation treatment makes only the surface of the bulk mesophase pitch infusible to prevent melting or adhesion in the following process of graphitizing burning. The oxidation-treated bulk mesophase pitch particles contains preferably 5 to 15% by weight of oxygen. When the oxygen content is less than 5% by weight, melt-adhesion between particles is likely to occur at heat treatment whereas when it exceeds 15% by weight, even inside of the particles is oxidized and the particles is graphitized remaining broken configuration resulting in reduction of dispersibility. Such cases, therefore, are not desirable.

Then, the oxidation-treated bulk mesophase pitch particles are carbonized by the primary burning at about 800 to 1,200° C. under inert atmosphere such as nitrogen or argon, subsequently subjected to the secondary burning at about 2,000 to 3,500° C. to give the desired graphitized particles.

For a method for obtaining the meso carbon microbeads which are another preferable ingredient to obtain the graphitized particles used in the invention, a typical method will be illustrated as follows: coal heavy oil or petroleum heavy oil is heat-treated at temperature of 300 to 500° C., perform polycondensation reaction to generate crude meso carbon microbeads. The reaction product obtained is treated including filtering, sedimentation at standing and centrifugal separation to separate the meso carbon microbeads, then washed with a solvent such as benzene, toluene and xylene, and then dried to give the meso carbon microbeads as the ingredient.

When graphitizing the meso carbon microbeads obtained, primary dispersion is preferably performed mechanically by the mild power such that it does not break the dried meso carbon microbeads so as to prevent agglomeration of particles and to obtain homogeneous particles size in the carbonization process.

The meso carbon microbeads after completion of the primary dispersion are subjected to the primary burning at temperature of 200 to 1,500° C. under inert atmosphere to be carbonized. After completion of the primary burning, the carbide particles are preferably dispersed mechanically by the mild power such that it does not break the carbide particles so as to prevent agglomeration of particles and to obtain homogeneous particles size in the graphitization process.

The carbide after completion of the primary burning is subjected to the secondary burning at 2,000 to 3,500° C. under inert atmosphere to give the desired graphitized particles.

For graphitized particles obtained from any ingredient and manufacturing method, distribution of the particles size is preferably homogenized to some extent by classification so as to homogenize the configuration of the surface of the resin-coated layer.

Also, for manufacturing method using any ingredient, burning temperature for graphitization is preferably 2,000 to 3,500° C., more preferably 2,300 to 3,200° C.

When the burning temperature for graphitization is less than 2,000° C., the graphitization degree of the graphitized particles is reduced, electroconductivity and lubricity decrease, therefore, charge-up of the toner and toner melt-adhesion may occur and lowering of the image quality is likely to occur including sleeve ghost, fogging, reduction of image density. Particularly, in the developing process, when using an elastic blade and a toner with high sphericity, streaks and unevenness of density in the image are likely to occur because of toner melt-adhesion on the surface of the developing sleeve. On the other hand, when the burning temperature exceeds 3,500° C., the graphitization degree of the graphitized particles may be too high. The graphitized particles with high graphitization degree reduces hardness. Reduction of hardness of the graphitized particles causes reduction of abrasion resistance of the surface of the resin-coated layer. Accordingly, the microunevenness provided by the graphitized particles on the surface of the resin-coated layer is difficult to be maintained, further composition of the surface of the resin-coated layer is likely to be changed. Consequently, charge-up of the toner and tone melt-adhesion may occur.

In the resin-coated layer constituting the developer carrying member of the invention, the roughing particles together with graphitized particles are dispersed in the resin-coated layer. The roughing particles allow the appropriate surface roughness retained on the surface of the resin-coated layer of the developer carrying member leading to improvement of conveyability of the toner, increasing opportunities of contact between the toner as bulk and the resin-coated layer as well as it improves abrasion resistance of the resin-coated layer. Further, they have an effect of moderating the pressure applied on the toner from the elastic blade if used to prevent toner melt-adhesion.

True density of the roughing particles used in the invention is preferably not more than 3 g/cm$^3$, more preferably not more than 2.7 g/cm$^3$, even more preferably 0.9 to 2.3 g/cm$^3$. When true density of the roughing particles exceeds 3 g/cm$^3$, dispersibility of roughing particles in the resin-coated layer decreases, which makes them difficult to produce homogeneous roughness on the surface of the resin-coated layer. Accordingly, reduction of homogeneous frictional electrification of the toner and reduction of strength of the resin-coated layer are likely to occur. Also, when true density of the roughing particles is lower than 0.9 g/cm$^3$, dispersibility of roughing particles in the resin-coated layer may decrease.

The form of the roughing particles used in the invention is preferably spherical and the average circularity, SF-1, the mean value of the circularity which is obtained from the following equation is preferably not less than 0.75, more preferably not less than 0.80:

$$\text{Circularity}=(4\times A)/((ML)^2\times\pi) \quad (2)$$

(wherein ML represents the maximum length of projection of the particles by Pythagoras method and A represents the area of projection of the particles).

As a specific technique in the invention for obtaining the average circularity, SF-1 described above, the roughing particles projection expanded by the optical system is incorporated into the image analytic apparatus to calculated the value of circularity for each particles which is then averaged.

In the present invention, the circularity is measured limiting to the range 2 μm or more of the particles size corresponding to the circular diameter which gives reliability as the mean value and substantially effects on characteristics against the resin-coated layer. In addition, for the number of the particles, preferably 3,000 or more particles, more preferably 5,000 or more particles are measured in order to obtain reliability of these values.

As such a specific measuring apparatus capable of performing analysis of circularity of a number of roughing particles efficiently, there is, for example, Multi Image Analyzer (made by Beckman Coulter Co., Ltd.).

In the Multi Image Analyzer, function of photographing the particles image by CCD camera and function of image analyzing of the particles image photographed are combined with a measuring apparatus for particles size distribution by the electric resistance method. Specifically, particles to be measured dispersed homogeneously in a electrolyte solution by ultrasonic wave and the like are detected by change of electric resistance when the particles passes through the aperture of the multi-sizer which is the measuring apparatus for particles size distribution by the electric resistance method with which coincidently a strobe is emitted and the particles image is photographed by CCD camera. This particles image is taken into a personal computer, binary digitized, then image analyzed.

From the above apparatus, the maximum length of projection of the particles by Pythagoras method, ML, and the area of projection, A are obtained, then values of circularity for 3,000 or more particles the size of which is not less than 2 μm are calculated from the above equation (2) and the resulting values are averaged to give the average circularity, SF-1.

When the average circularity, SF-1 is less than 0.75, reduction of dispersibility of the roughing particles into the resin-coated layer as well as inhomogeneous roughness on the surface of the above resin-coated layer are likely to be generated, consequently, toner melt-adhesion on the surface of the developing sleeve, reduction of homogeneous frictional electrification of the toner and reduction of strength of the resin-coated layer may occur.

As roughing particles used in the invention, those known are usable including, but not particularly limited to, for example, spherical resin particles, sperical metal oxides particles and spherical carbide particles.

As spherical resin particles, the resin particles obtained from a suspension polymerization or dispersion polymerization method can be used. Spherical resin particles among spherical particles can be used suitably because they can provide suitable surface roughness to the resin-coated layer with smaller addition amount, further they easily make the surface configuration of the resin-coated layer homogeneous. Materials of such spherical resin particles include acrylic resin particles such as polyacrylate and polymethacrylate; polyamide resin particles such as nylon; polyolefin resin particles such as polyethylene and polypropylene; silicone resin particles, phenol resin particles, polyurethane resin particles, styrene resin particles and benzoguanamine resin particles. Spherical resins obtained from thermal or physical spherical treatment of the resin particles obtained by a pulverization method may be also used.

Inorganic materials may be used by attaching or sticking to the surface of the spherical particles described above. Such inorganic materials include oxides such as $SiO_2$, $SrTiO_3$, $CeO_2$, CrO, $Al_2O_3$, ZnO and MgO; nitrides such as $Si_3N_4$; carbide such as SiC; sulfates such as $CaSO_4$ and $BaSO_4$; and carbonates such as $CaCO_3$. Such inorganic materials may be used after treatment with coupling agents.

Inorganic materials treated with coupling agents can be preferably used particularly for the purpose of improvement of adhesion between the spherical particles and coated resin or provision of hydrophobicity to the spherical particles. Such coupling agents include silane coupling agents, titanium coupling agents and zircoalminate coupling agents. More specifically, silane coupling agents include hexamethyldisilazane, trimethylsilane, trimethychlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorsilane, α-chloroethyltrichlorosilane, β-chloroethyltrichlorosilane, chloromethyldimethylchlorosilane, triorganosilyimercaptane, trimethylsilylmercaptane, triorganosilyl acrylate, vinyldimethylacetoxysilane, dimethyldiethoxysilane, dimethyldimethoxysilane, diphenyldiethoxysilane, hexamethyldisiloxane, 1,3-divinyltetramethyldisiloxane, 1,3-diphenyltetramethyldisiloxane and dimethylpolysiloxane which has 2 to 12 siloxane units per molecule and contains hydroxyl groups each bound to a silicon atom in the unit positioned at the terminal.

Thus, by treatment of attaching or sticking inorganic materials on the surface of the spherical resin particles, dispersibility into the resin-coated layer, homogeneity on the surface of the resin-coated layer, blotching resistance of the resin-coated layer, frictional electrification to the toner and abrasion resistance of the resin-coated layer can be improved.

Further, the spherical particles used in the invention is preferably electroconductive because conferring electroconductivity on the spherical particles can prevent accumulation of frictional charge on the surface of the spherical particles resulting in reduction of toner adhesion and improvement of electrification to the toner.

In the present invention, the spherical particles have preferably not more than $10^6$ Ω·cm, more preferably $10^{-3}$ to $10^6$ Ω·cm of volume resistivity. If volume resistivity of the spherical particles exceeds $10^6$ Ω·cm, blotching and melt-adhesion of the toner by spherical particles as cores exposed by friction on the surface of the resin-coated layer are likely to occur as well as rapid and homogeneous frictional electrification become difficult.

Particularly, preferable methods for obtaining electroconductive spherical particles include a method wherein resin spherical particles meso carbon microbeads are burned to be carbonized and/or graphitized giving spherical carbon particles which have low density and good electroconductivity. Resins used for resin spherical particles include phenol resins, naphthalene resins, furan resins, xylene resins, divinylbenzene resins, styrene-divinylbenzene copolymers or polyacrylonitrile. The meso carbon microbeads can be usually manufactured by washing the spherical crystals generated during the process of heating burning the middle pitch with much amount of solvent such as tar, middle oil and quinoline.

Methods for obtaining more preferable electroconductive spherical particles include a method wherein the surface of the spherical resin particles such as phenol resins, naphthalene resins, furan resins, xylene resins, divinylbenzene resins, styrene-divinylbenzene copolymers or polyacrylonitrile is coated with bulk mesophase pitch using a mechanochemical method, the coated particles are heat-treated under the oxidation atmosphere, then burned under inert atmosphere or under vacuum to be carbonized and/or graphitized giving electroconductive spherical carbon particles. The spherical carbon particles obtained by this method are more preferable because crystallization of the coated part of the spherical carbon particles obtained upon graphitization is advanced, which improves electroconductivity.

Since electroconductivity of the spherical carbon particles obtained can be controlled in any method by changing burning conditions, the electroconductive spherical carbon particles obtained from the methods described above are preferably used in the invention. In addition, the spherical carbon particles obtained by the methods described above may optionally be plated with electroconductive metals and/or metal oxides in order to further enhance electroconductivity within the range so that true density of the electroconductive spherical particles is not too high.

The resin-coated layer of the present invention which carries the developer is characterized in that in the surface configuration of the resin-coated layer as measured by use of focusing optical laser, the volume (B) of a microunevenness region defined by a certain area (A) of the microunevenness region without convexity formed by the roughing particles meets the following relationship: preferably, 5.0≦B/A≦6.5, more preferably 5.0≦B/A≦6.0.

Measurement of the volume (B) of the microunevenness region defined by a certain area (A) of the microunevenness region without convexity formed by roughing particles is performed using, for example, Super Depth Configuration Measurement Microscope VK-8500 (KEYENCE Company-made). In this apparatus, laser emitted from the light source is applied to the object and reflected from the object and then from information of objective's position at the maximum amount of reflection light received at light receiving element positioned at cofocal point, configuration of the object is measured.

For measuring conditions, the surface of the resin-coated layer is observed using 100-fold objective with a magnification of 2000, then the area A of lateral 20 μm×longitudinal 20 μm ($4\times10^{-10}$ $m^2$) without convexity formed by roughing particles on the resin-coated layer is appropriately selected, subsequently, vertical movement amount of the lens is set as 0.1 μm to perform measurement. The measurement results are analyzed using the image analyzing software, VK-HIW (made by KEYENCE Co., Ltd.) to calculate the volume B ($m^3$) of the microtopographical portion observed on the area A ($4\times10^{-10}$ $m^2$) in the measured region. As measurement points, 20 points or more are measured to calculate the mean value of the volume and obtain B/A.

When forming such a surface topography that B/A exceeds 6.5, microunevenness on the surface of the resin-coated layer is enlarged, and further inhomogenenuity of the microunevenness increases. Particularly, when using an elastic blade and a toner with high sphericity, the toner melt-adhesion starting from a point in inhomogeneous microunevenness is likely to occur and image streaks and unevenness of image density may occur.

When B/A is less than 4.5, the microunevenness surface is so little that releasability from the toner surface reduces as well as contact opportunities between graphitized particles and toner particles become fewer. Accordingly, sleeve ghost and toner blotching due to toner's charge-up are likely to occur.

The dispersion state in the resin-coated layer of the graphitized particles and the application method are preferably controlled in order to control B/A so that it is between 4.5 and 6.5 wherein B/A represents degree of the microunevenness in the region where the roughing particles do not form the convexity part on the surface of the resin-coated layer.

For the method of controlling B/A according to the dispersion state of graphitized particles, the graphitized particles are preferably dispersed so that their volume-average particles size is 0.5 to 4.0 μm in the resin-coated layer. If the above volume average particles size is less than 0.5 μm, it would be difficult for graphitized particles to form the microtopographical surface on the resin-coated layer and B/A is likely to be less than 4.5. On the other hand, if the volume-average particles size exceeds 4.0 μm, surface topography on the resin-coated layer provided by the graphitized particles would be so large that B/A is likely to exceed 6.5.

In volume distribution of the graphitized particles dispersed in the resin-coated layer, particles with over 10 μm of the particles size is preferably not more than 5 volume %, more preferably not more than 2% by volume. If particles with 10 μm or more of the particles size exceed 5 volume %, inhomogeneous topography on the surface of the resin-coated layer owing to the graphitized particles is likely to generate, accordingly, B/A is likely to exceed 6.5.

The volume-average particles size of the graphitized particles in the resin-coated layer can be controlled by a method wherein particles size distribution of the graphitized particles used is adjusted by grinding or classification or by adjusting dispersion strength of the graphitized particles into the resin-coated layer.

The particles size of electroconductive particles such as the graphitized particles is measured using, for example, laser diffraction type particles size distribution meter, Coulter LS-230 type particles size distribution meter (Coulter Co., Ltd.-made). For the measuring method, the small amount module is used and for measuring solvent, isopropyl alcohol (IPA) is used. After washing the inside of the measuring system of the particles size distribution meter for about 5 minutes, the background function is performed.

Then, 1 to 25 mg of the sample to be measured are added in 50 ml of IPA. The sample-suspended solution is subjected to dispersion treatment with an ultrasonic wave disperser for about 1 to 3 minutes to give a sample solution which is slowly added into the measuring system of the measuring apparatus. Measurement is performed by adjusting the sample concentration in the measuring system so that PIDS on the screen of apparatus falls in 45 to 55%. The volume average particles size is obtained by calculation from volume distribution.

On the other hand, for the technique of controlling B/A by an application method, B/A is likely to be controlled somewhat large by using air spray application whereas somewhat small by using dipping application in general, although varying depending on prescription and characteristics of the resin-coated layer used.

Further, for the developer carrying member of the invention, arithmetic mean roughness (Ra) (hereinafter referred to "Ra") of the resin-coated layer surface is preferably 0.9 to 2.5 μm, more preferably 1.0 to 2.0 μm.

If Ra is less than 0.9 μm, particularly in the case of using an elastic blade and a toner which has high sphericity, toner melt-adhesion and charge-up are likely to occur. Accordingly, reduction of image density, image streaks, unevenness of image density and sleeve ghost may occur.

When Ra exceeds 2.5 μm, so much conveyance amount of the toner on the developer carrying member prevents from homogenous of frictional electrification to the toner. Consequently, fogging and sleeve ghost are likely to occur.

For arithmetic mean roughness (Ra) of the surface of the developer carrying member, measurement is performed for 3 points in the axial direction×3 points in the circumference direction=9 points each to obtain the mean value based on the surface roughness of JIS BO601 using, for example, Kosaka Lab.-made Surfcoder SE-3500 under measurement conditions as follows: cut off: 0.8 mm, evaluation length: 4 mm, conveyance speed: 0.5 mm/s.

In order to control Ra of the developer carrying member within 0.9 to 2.5 μm, the volume-average particles size of the roughing particles used in the resin-coated layer is preferably selected as follows.

For the roughing particles used in the invention, the volume-average particles size is preferably 5.5 to 20.0 μm, more preferably 8.0 to 18.0 μm. If the volume-average particles size of the roughing particles is less than 5.5 μm, much amount of roughing particles needs to be added to adjust Ra of the resin-coated layer surface to 0.9 or more, accordingly, the graphitized particles on the surface of the resin-coated layer reduce relatively. Consequently, lubricity and electrification of the surface of the resin-coated layer are likely to be damaged.

If the volume-average particles size of the roughing particles exceeds 20 μm, roughness of the resin-coated layer surface is likely to be inhomogeneous and it is difficult to control Ra to 2.5 or less. Accordingly, frictional electrification of the toner slows down as well as homogenous and sufficient frictional electrification is prevented, consequently, fogging and negative sleeve ghost are likely to occur. Further, when using an elastic blade, flaws are likely to be generated on the applied blade owing to inhomogeneous convexity of the surface of the resin-coated layer.

Measurement of the volume-average particles size of the roughing particles is performed similarly to the measurement of graphitized particles as described above.

For the developer carrying member, the lubricant particles further can be used together by dispersing in the resin-coated layer. The lubricant particles include graphite, molybdenum disulfide, boron nitride, mica, graphite fluoride, silver-niobium selenide, calcium chloride-graphite, talc and aliphatic acid metal salts (zinc stearate etc.). The volume average-particles size of these lubricant particles in the resin-coated layer is preferably 0.5 to 4.0 μm for the similar reasons to those in the case of graphitized particles.

In the present invention, volume resistivity of the developer carrying member in the resin-coated layer is preferably $10^{-2}$ to $10^{5}$ Ω·cm, more preferably $10^{-2}$ to $10^{3}$ Ω·cm. When the volume resistivity exceeds $10^{5}$ Ω·cm, charge-up of the toner is likely to occur, accordingly, toner blotching is likely to occur.

For measurement of volume resistivity in the resin-coated layer, 7 to 20 μm of the resin-coated layer is formed on polyethylene terephthalate (PET) sheet with thickness of 100 μm to measure the volume resistivity value with a resistivity meter, Loresta AP or Hiresta IP (both made by Mitsubishi Chemical) using the 4-terminal probe. For measurement environment, the temperature is 20 to 25° C. and humidity is 50 to 60% RH.

In the present invention, other electroconductive fine particles may be contained in the resin-coated layer by dispersion together with the graphitized particles to adjust the volume resistivity of the resin-coated layer to the above value.

For electroconductive fine particles, the number average particles size is preferably not more than 1.00 μm, more preferably, 0.01 to 0.80 μm. When the number average particles size of the electroconductive fine particles contained in the resin-coated layer by dispersion together with the graphitized gains exceeds 1.00 μm, volume resistivity of the resin-coated layer is difficult to be controlled homogeneously and the toner is prevented from homogeneously frictional electrification.

The electroconductive fine particles which can be used in the present invention include carbon black such as furnace black, lump black, thermal black, acetylene black and channel black; fine particles of metal oxides such as titanium oxide, tin oxide, zinc oxide, molybdenum oxide, potassium titanate, antimony oxide and indium oxide; fine particles of metals such as aluminum, copper, silver and nickel; and graphite. Metal fibers and carbon fibers may be optionally used.

Content of electroconductive fine particles contained in the resin-coated layer together with graphitized particles is preferably not more than 40 parts by weight, more preferably 2 to 35 parts by weight based on 100 parts by weight of the coating resin. Such content is preferable because the volume resistivity can be adjusted to the desired value as described above without damaging other physical properties required for the resin-coated layer.

The content of electroconductive fine particles exceeding 40 parts by weight is not preferable because strength of the resin-coated layer is decreased.

As a coating resin of the resin-coated layer which constitutes the developer carrying member of the invention, known resins which have been conventionally used in general in the resin-coated layer of the developer carrying member can be used. For example, there are styrene resins, vinylic resins, polyether sulfone resins, polycarbonate resins, polyphenylene oxide resins, polyamide resins, fluorine resins, fibrous resins, thermoplastic resins such as acrylic resins etc., epoxy resins, polyester resins, alkyd resins, phenol resins, melamine resins, polyurethane resins, urea resins, silicone resins, polyimide resins. Of them, preferably are those which have releasable property such as silicone resins and fluorine resins, or those excellent in mechanical properties such as polyether sulfone, polycarbonate, polyphenylene oxide, polyamide, phenol, polyester, polyurethane, styrene and acrylic resins. More preferably, thermoplastic resins or photocurable resins may be used.

In the present invention, a charging controlling agent may be contained in the resin-coated layer together with the graphitized particles. In that case, content of the charging controlling agent is preferably 1 to 100 parts by weight on based on 100 parts by weight of the coating resin. With less than 1 part by weight, effect of charging controllability by adding is low, whereas if exceeding 100 parts by weight, poor dispersion occurs in the resin-coated layer, consequently, reduction of film strength is likely to occur.

The charging controlling agents include nigrosine, nigrosine denatured with aliphatic acid metal salts; quaternary ammonium salts such as tributylbenzylammonium-1-hydroxy-4-naphthosulfonate and tetrabutylammonium tetrafluorohorate; phosphonium salts such as tributylbenzylphosphonium-1-hydroxy-4-naphthosulfonate and tetrabutylphosphonium tetrafluoroborate; these lake pigments (phosphotungstic acid, phosphomolybdic acid, phosphotungsticmolybdic acid, tannic acid, lauric acid, gallic acid, ferricyanide, ferrocyanide, etc. as lake agents), metal salts of higher aliphatic acids; diorganotin oxides such as butyltin oxide, dioctyltin oxide and dicyclohexyltin oxide; diorganotin berates such as butyltin borate, dioctyltin borate and dicyclohexyltin borate; guanidines, imidazole compounds.

Among these charging control agents when using a negative toner which has high sphericity degree, quaternary ammonium salt compounds which have positive electrification to iron powder are preferably contained in the resin-coated layer as a charging control agent in view of improvement of good electrification to the toner of the invention. The resin-coated layer more preferably has at least any of amino group, =NH group or —NH— bond in the resin structure in view of good electrification to the negative toner having high sphericity used in the invention.

Providing the resin-coated layer in combination of a quaternary ammonium salt compound and a coating resin on the substrate of the developer carrying member functions toward prevention from excessive charging of the negative toner with high sphericity, therefore, frictional electrification to the negative tone can be controlled. Accordingly, charge-up of the toner on the developer carrying member is prevented, toner melt-adhesion on the resin-coated layer surface is prevented, high charging stability of the toner can be retained. Consequently, highly minute images with environmental stability and long-term stability can be provided.

Though there is no clear reasons, it is presented as follows. The quaternary ammonium salt compound preferably used in the invention which has positive electrification to iron powder, when added into the resin-coated layer, is dispersed homogeneously in the resin which has at least one of amino group, =NH group or —NH— group in the molecular chain, further upon forming the cost, the resin composition itself which has the quaternary ammonium salt compound quaternary ammonium salt compound will have negative charging. Therefore, it functions toward preventing the negatively charging, consequently it enables controlling appropriately negative charging amount of the toner.

For the quaternary ammonium salt compound preferably used in the invention which has the function described above, any of those which have positive electrification to iron powder may be used. The quaternary ammonium salt compound includes, for example, the compound represented by the following general formula:

[Chemical Formula 1]

(General Formula)

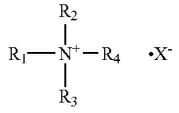

(wherein $R_1$, $R_2$, $R_3$ and $R_4$ each may be same or different and represents an alkyl group which may have substituents, aryl group which may have substituents or aralkyl group; and $X^-$ represents an anion of acid).

In the general formula, an acid ion of $X^-$ includes heteropolyacids containing organosulfate ion, organosulfonate ion, organophophate ion, molybdate ion, tungstate ion, molybdenum atom or tungsten atom.

Specifically, the quaternary ammonium salt compounds preferably used in the invention which has positive electrification to iron powder include, but not limited to the followings.

(1)

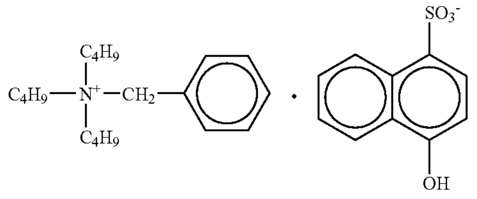

-continued (2)

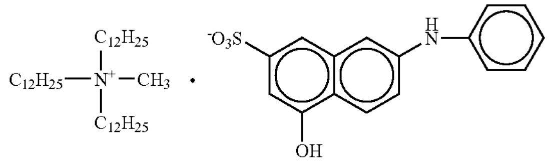

(3)

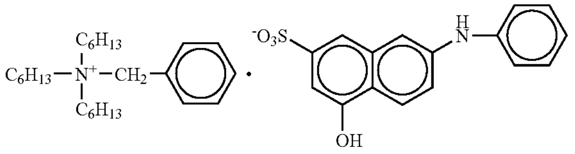

(4)

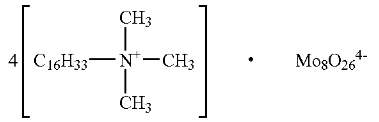

(5)

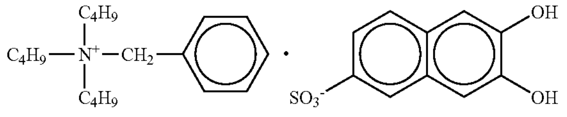

(6)

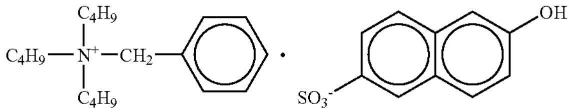

(7)

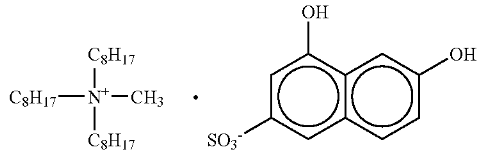

(8)

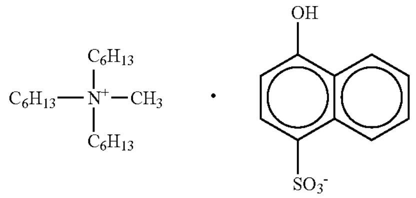

(9)

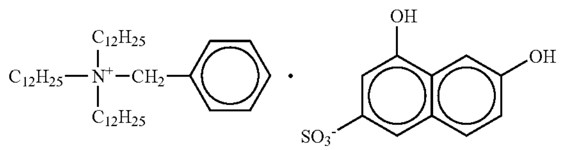

(10)

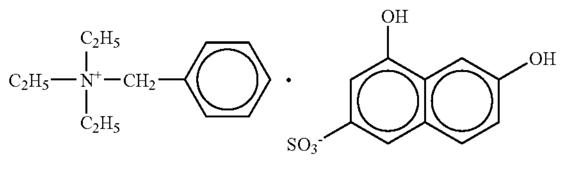

-continued (11)

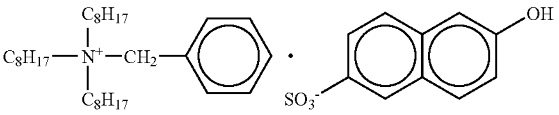

(12)

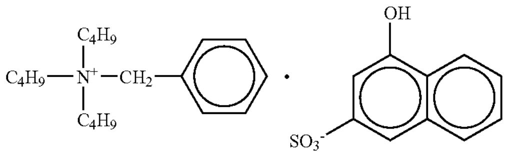

(13)

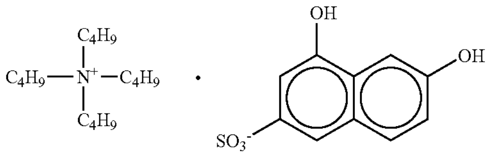

(14)

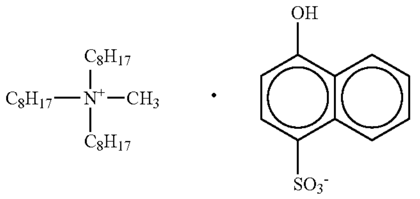

(15)

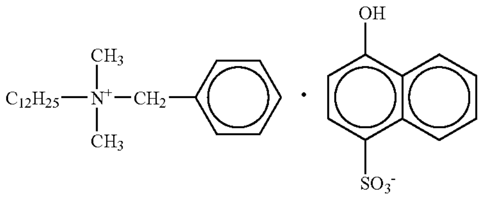

(16)

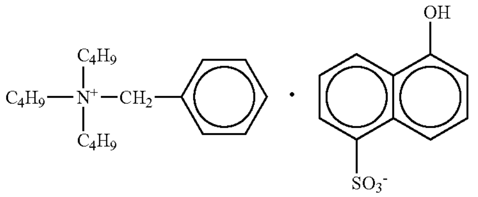

(17)

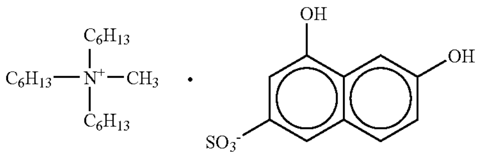

(18)

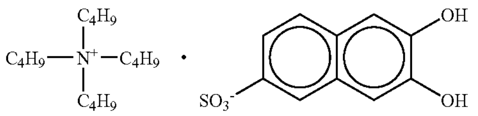

(19)

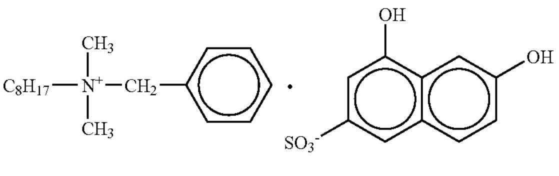

The preferred resins containing at least one of an amino group, =NH group or —NH-group in a molecular chain in combination with quaternary ammonium salts include phenol resins, polyamide resins, epoxy resins using a polyamide as a curing agent, urethane resins or copolymers containing these resins in a part, which were manufactured using a nitrogen-containing compound as a catalyst in the manufacturing process. The quaternary ammonium salt compound is dispersed in the coating resin when making a film of a mixture with these coating resin.

In the present invention, for the phenol resins which may be used suitably in combination with quaternary ammonium salts, nitrogen-containing compounds used as an acidic catalyst in the manufacturing process of the phenol resins include: ammonium salts or amine salts such as ammonium sulfate, ammonium phosphate and ammonium sulfamate, ammonium carbonate, ammonium acetate and ammonium maleate. In the manufacturing process of the phenol resins, the nitrogen-containing compounds used as basic catalyst include: ammonia; amino compounds such as dimethylamine, diethylamine, diisopropylamine, diisobutylamide, diamylamine, trimethylamine, triethylamine, tri-n-butylamine, triamylamine, dimethylbenzylamine, diethylbenzylamine, dimethylaniline, diethylaniline, N,N-di-n-buthylaniline, N,N-diamylaniline, N,N-di-t-amylaniline, N-methylethanolamine, N-ethylethanolamine, diethanolamine, triethanolamine, dimethylethanolamine, diethylethanolamine, ethydiethanolamine, n-butyldiethanolamine, di-n-butylethanolamine, triisopropanclamine, ethylenediamine and hexamethylenetetramine; pyridine; pyridine derivatives such as α-picoline, β-picoline, γ-picoline, 2,4-lutidine and 2,6-lutidine; quinoline compounds; imidazole; imidazole derivatives such as 2-methyl imidazole, 2,4-dimethylimidazole, 2-ethyl-4-methylimidazole, 2-phenylimidazole, 2-phenyl-4-methylimidazole, 2-heptadecylimidazcle; and nitrogen-containing heterocyclic compounds.

As the polyamide resins comprising the coating resin used suitably in the invention nylon 6, 66, 610, 11, 12, 9 and 13, Q2 nylon, a copolymer of nylon using these as a main component, N-alkyl modified nylon or N-alkoxyalkyl modified nylon may be used suitably. Further, various resins modified by polyamides such as a polyamide modified phenol resin or a resin containing a polyamide resin part such as an epoxy resin using the polyamide resin as a curing agent can be used.

As a coating resin used suitably in combination with quaternary ammonium salts, urethane resins which urethane bond may be used. The urethane bond is obtained by polymerizing addition reaction of polyisocyanates with polyols. The polyisocyanates which are main raw materials of the polyurethane resins include: aromatic polyisocyanates such as TDI (tolylene diisocyanate), pure MDI (diphenylmethane diisocyanate), polemeric MDI (polymethylenepolyphenyl polyisocyanate), TODI (tolidine diisocyanate), and NDI (naphthelene diisocyanate); and aliphatic polyisocyanates such as HMDI (hexamethylene diisocyanate), IPDI (isophorone diisocyanate), XDI (xylilene diisocyanate), hydrogenated XDI (hydrogenated xylilene diisocyanate) and hydrogenated MDI (dicyclohexylmethane diisocyanate).

The polyols which are main raw materials of the polyurethane resins include: polyether polyoles such as polyoxypropylene glycol (PPG), polymer polyol and polytetramethylene glycol (PTMG); polyester polyols such as adipate, polycaprolactone and polycarbonate polyol; polyether modified polyols such as PHD polyols and polyether ester polyols; epoxy modified polyols; partially saponified polyols (saponified EVA) of ethylene-vinyl acetate copolymers; and flame retardant polyols.

Now, constitution of the present inventive developer carrying member will be described. The developer carrying member of the invention has a substrate and a resin-coated layer formed on the surface of the substrate.

Shapes of the substrate include a cylindrical member, a columnar member and a belt member. When using a developing method without contacting a photosensitive member drum, a cylindrical metal member is preferably used. Specifically, the cylindrical metal tube is preferably used. For the cylindrical metal tube, non-magnetic stainless steel, non-magnetic aluminum and non-magnetic alloy are major materials used suitably.

As a substrate when using a developing method via contacting directly with the photosensitive member drum, the columnar member having a layer containing rubber such as urethane rubber, EPDM rubber and silicone rubber, urethane elastomer, EPDM elastomer and silicone elastomer in the metal core is preferably used. For the developing method using a magnetic developer, a magnet roller which installs a magnet inside is placed in the developer carrying member in order to absorb magnetically and retain the magnetic developer onto the developer carrying member. In that case, the substrate is made syrindrical and the magnet roller is placed inside.

Constitution of the resin-coated layer in the present inventive developer carrying member will be described as follows. FIG. 1 is a schematic section view showing a part of the developer carrying member of the present invention. In FIG. 1, the resin-coated layer 17 wherein the graphitized particles having a specified graphitization degree a and the coarse particles b are dispersed in the coated resin c is laminated on the substrate 16 formed with the metal cylindrical tube.

In FIG. 1, the surface of the resin-coated layer 17 on which the convexity part given to the coarse particles a is not present forms the microunevenness by the graphitized particles b because the graphitized particles b is homogeneously and minutely dispersed in the coated resin c. For this reason, the surface of the resin-coated layer forming the microunevenness by the graphitized particles b is likely to obtain good electrification by releasability of the toner caused by the microunevenness and increased area contacting the surface of the toner particles as well as it has constitution likely to exhibit lubricity, electroconductivity and electrification caused by the graphitized particles themselves, and inhomogeneous unevenness formed by the graphitized particles is reduced. Accordingly, it is difficult to generate the toner melt-adhesion and configured to be easily electrified rapidly and homogeneously for the toner.

On the other hand, the roughing particles a has a shape close to a sphere and the height and a number of convexity are made such that mean roughness Ra of the center line on the surface of the resin-coated layer is 0.9 to 2.5. Formation of the convexity may improve conveyability of the toner onto the resin-coated layer and abrasion resistance of the surface of the resin-coated layer as well as reduce mechanical deterioration of the toner by the regulatory member of toner, therefore may perform stably electrification of the toner and prevent occurrence of the toner melt-adhesion.

Further, the constitution ratio of each component which constituted the resin-coated layer will be described. Particularly, this constitution ratio of the invention is a preferred range, but the invention is not limited to this range.

The content of the graphitized particles dispersed in the resin-coated layer is in a range of preferably 30 to 160 parts by weight based on 100 parts by weight of the coated resin, more preferably 50 to 130 parts by weight. Consequently, retainment of the surface configuration of the developer carrying member and ability of electrification to the toner and effect on melt-adhesion prevention of the toner may be exhibited. When the content of the graphitized particles is less than 30 parts by weight, addition effect of the graphitized particles is less, while when exceeding 160 parts by weight, abrasion resistance may be reduced because adhesion of the resin-coated layer is too low.

The content of the roughing particles contained in the resin-coated layer together with the graphitized particles is set as a range of preferably 2 to 60 parts by weight based on 100 parts by weight of the coated resin, more preferably 2 to 50 parts by weight, thereby the preferred results are particularly given in regard to formation and retainment of Ra on the resin-coated layer, blotching of the toner and prevention of the toner melt-adhesion. When the content of the roughing particles is less than 2 parts by weight, additional effect of the coarse particles is less, while when exceeding 60 parts by weight, lubricity and electrification on the surface of the resin-coated layer may be damaged.

Layer thickness of the resin-coated layer is preferably not more than 25 μm, more preferably not more than 20 μm, even more preferably 4 to 20 μm so as to obtain the uniform film thickness, but not limited to this layer thickness. These layer thickness may be obtained if the solid part is stuck in an amount of 4,000 to 20,000 mg/m$^2$ on the surface of the substrate, though depending on materials used in the resin-coated layer.

Further, the toner used for the present inventive developer carrying member will be described.

Particles used in the present invention in the toner particles having the particle size of not less than 3 μm are not less than 0.935 to less than 0.970 in an average circularity, preferably not less than 0.935 to less than 0.965, more preferably not less than 0.935 to less than 0.960, even more preferably not less than 0.940 to less than 0.955. Since fluidity of the toner increases if the average circularity of the toner particles is within the above range, the individual particles are likely to move freely and to be frictionally electrified uniformly and rapidly as well as a probability to be developed with individual toners becomes high, accordingly, the toner height on the photosensitive member drum and on the transfer material becomes low and the adequate image concentration may be obtained even in less using amount of the toner.

In this case, unless the average circularity of the toner particles is high, the toner is likely to exhibit behavior as aggregate, consequently, the toner aggregate forms the toner image on the photosensitive member drum, further the toner image is transcribed on the transfer material. In such a toner image, height of the toner image on the transfer material becomes high, and in the case of developing the same area, a number of toners may be developed compared to the toner excellent in fluidity, consequently consumption of the toner will be increased. In addition, the toner having the toner particles of high average circularity is likely to take denser state in the toner image developed. Consequently, the hiding rate of the toner to the transfer material becomes high, then the sufficient concentration may be obtained even in less amount of the toner. When the average circularity is less than 0.935, height of the toner image developed is likely to be higher to increase consumption of the toner. For the toner image which has been developed with increasing apertures between toner particles, the sufficient hiding rate can not be obtained. Accordingly, in order to obtain the necessary image concentration, much amount of the toner may be required, resulting in increasing consumption of the toner. When the average circularity is 0.970 or more, the developing ability is likely to be deteriorated upon use of the toner for long term.

The average circularity is used as a simple method so as to quantitatively represent configuration of particles. In the present invention, using Sysmechs Co., Ltd.-made flow type particle image analyzer FPIA-2100, the particles in a range of 0.60 to 400 μm of the particle size corresponding to a circle are measured under the surroundings at 23° C. in 60% RH of humidity, where the circularity of particles measured is calculated based on the following equation (3), further the average circularity is defined as a value divided the sum total of the circularity by the number of all particles in the particles having the size corresponding to a circle in the particles of not less than 3 μm to not more than 400 μm:

$$\text{Circularity } a = L_0/L \quad (3)$$

(wherein $L_0$ represents: circumference length of a circle having the same projection area as particles image; and L represents circumference length of the particles projection when processing the image with resolution (pixel of 0.3 μm×0.3 μm) by image process of 512×512).

The average circularity used in the invention is an index of the topographical degree of toner particles, and when the toner is full spheres, it shows 1.00, and the more complicate the surface configuration is, the smaller value the average circularity is. Using "FPIA-2100" which is a measuring apparatus used in the invention, the circularity of each particles is calculated, thereafter when calculating the average circularity, the circularity, 0.4 to 1.0 of particles are divided into classes of 61 depending on the circularity obtained, then using the central values of divided points and frequency, the calculation method of the average circularity is performed. However, the error between a value of the average circularity calculated by this calculation method and the average circularity calculated by the calculation equation using the sum total of the circularity of each particles is extremely less, that is, substantially almost neglected. In the invention, from reasons on handling of data such as shortening the calculation time and simplifying the calculating arithmetic equation, utilizing the concept of the calculating equation using the sum total of the circularity of each particles, such a calculation method that is partly modified is used. Further, for "FPIA-2100" which is a measuring apparatus used in the invention, the precision for measuring toner configuration has been improved by making a sheath flow layer thinner (by thinning from 7 μm to 4 μm) and magnification of processed particles image higher, further enhancing (from 256×256 to 512×512) of resolution of the image process incorporated, compared to "FPIA1000" which has been used for calculating configuration of a toner so far. Accordingly, when requiring for measuring more accurate configuration and size distribution, FPIA-2100 is useful to obtain information of them.

As a specific measuring method, to a container containing 200 to 300 ml water in which impurities are removed beforehand, a 0.1 to 0.5 ml surfactant (preferably alkylbenzenesulfonates) as a dispersing agent is added, further about 0.1 to 0.5 g sample is added. The suspension dispersed with the sample is dispersed by an ultrasonic generator for 2 minutes, then distribution of the circularity of particles is measured using the dispersion concentration as two thousands to ten thousands particles/μl. The following ultrasonic generator and the dispersion conditions are used as follows:

Apparatus

UH-150 (S. M. T. Co., Ltd.-made)

Dispersion Conditions

OUTPUT level: 5

Constant Mode

Summary of measurement is as follows.

Sample dispersing solution is made to pass along the flow way (extending along the flow direction) of the flat flow cell (thickness of about 200 μm. A strobe and CCD camera are installed so that they are positioned opposed to each other against the flow cell in order to form the light way which passes intersectionally against the thickness of the flow cell. While the sample dispersing solution flows, strobe light is irradiated at intervals of 1/30 second to obtain the image of the particles flowing in the flow cell, consequently, each particles is photographed as a two-dimensional image which has a specific area parallel to the flow cell. From the area of each particles' two-dimensional image, the diameter of circle which has the same area is calculated as the size corresponding to the circle. From the projection area and circumference length of the projection of each particles' two-dimensional image, each particles' circularity is calculated using the above equation for calculation of the circularity.

Further in the present invention, for number-average particles size distribution measured by flow type particles image measuring apparatus, the rate of toner particles with not less than 0.6 μm and 3 μm is 0 particles or more % and fewer than 20 particles %, preferably 0 particles % or more and fewer than 17 particles %, more preferably 1 particles % or more and fewer than 15 particles %. The toner particles with not less than 0.6 μm and less than 3 μm has substantial influence on toner's developing properties, particularly on fogging characteristic. Such a fine particles toner has excessively high frictional electrification leading to the toner's charge-up. Consequently, fogging is likely to occur at developing the toner as well as the fine particles toner is likely to fuse on the surface of the developer carrying member in repeated developing. The present invention can reduce the fogging and toner melt-adhesion owing to lower rate of such a fine particles toner.

The toner with high average circularity is likely to be in the state that the toner is closely packed and the toner is coated thicker on the developing sleeve. Consequently, the charging amount differs between the upper layer and lower layer occur wherein the image density after the second circuit reduces compared with that at initial point when large area of the image is developed continuously. In this case, if there is much superfine powder in the toner, sleeve negative ghost gets worse because the superfine powder has higher charging amount than other toner particles. In the invention, since there id little amount of superfine powder, change for the worse of the sleeve negative ghost can be controlled. When the rate of the particles of not less than 0.6 μm and less than 3 μm is not fewer than 20 particles %, fogging on the image is likely to increase and the sleeve negative ghost is likely to further get worse. For the toner particles used in the invention, number-cumulative value of the toner with less than 0.960 of circularity is not fewer than 20 particles % and fewer than 70 particles %, preferably not less than 25 particles % and fewer than 65 particles %, more preferably not fewer than 30 particles % and fewer than 65 particles %, even more preferably not fewer than 35 particles % and fewer than 65 particles %. The circularity of the toner particles varies depending on individual toner particles. If the circularity varies, the characteristics as the toner particles also vary, therefore, it is preferable that the rate of the toner particles with appropriate circularity is a proper value in view of enhancement of developability of the toner. The toner particles used in the invention has an appropriate circularity as well as the toner has appropriate circularity distribution. Accordingly, changing distribution of the toner is homogeneous and fogging can be reduced. When the number-cumulative value of the toner particles with less than 0.960 of circularity is fewer than 20 particles %, the toner particles may be deteriorated during endurance. When the number-cumulative value of the toner particles with less than 0.960 of circularity is not fewer than 70 particles %, fogging may get worse or image density under the environment of high temperature and high humidity may be reduced.

Further in the invention, the average surface roughness of the toner particles is not less than 5.0 nm and less than 35.0 nm, preferably not less than 8.0 nm and less than 30.0 nm, more preferably not less than 10.0 nm and less than 25.0 nm. When the toner particles has appropriate surface roughness, appropriate space between the toner particles is produced which can lead to improvement of fluidity of the toner resulting in better developability. Since the toner particles contained in the toner used in the invention which has specific circularity has specific average surface roughness, it can provide excellent fluidity to the toner. Further, the toner used in the invention has few superfine particles of less than 3 μm which is effective for improvement of fluidity. When there are many superfine particles in the toner, the superfine particles enter into a concave portion on the surface of the toner particles, which makes the average surface roughness of the toner particles lower, accordingly, the space between the toner particles reduces which prevent providing preferable fluidity to the toner. When the average surface roughness of the toner particles is less than 5.0 nm, it is difficult to provide sufficient fluidity to the toner, accordingly fading occurs to reduce the image density. When the average surface roughness of the toner particles is not less than 35.0 nm, the space between the toner particles is so much that scattering of the toner is likely to occur.

In the invention, the average surface roughness of the toner particles is measured using scanning probe microscope. An example of the measuring method is shown as follows.

Probe station: SPI3800N (Seiko Instruments Cc., Ltd.-made)

Measuring unit: SPA400

Measuring mode: DFM (resonance mode) configuration image

Cantilever: SI-DF40P

Resolving degree:

X data number 256

Y data number 128

In the present invention, the area within a radius of 1 μm of the toner particles is measured. For the toner particles to be measured, the toner particles equal to the weight-average particles size ($D_4$) measured by the Coulter Counter method are randomly selected. For the measured data, the secondary correction is performed. 5 or more different toner particles are measured to calculate the average value of the data obtained that is set as the average surface roughness of that toner particles. Each term will be described as follows.

Average Surface Roughness (Ra)

This is 3-dimensional extension of the center line average roughness (Ra) defined in JIS B0601 in order to apply to the measuring surface. It is the average value of the absolute value of deviation from the standard surface to the designated surface, which is represented by the following equation:

$$Ra = \frac{1}{S_0}\int_{Y_B}^{Y_T}\int_{X_L}^{X_R}|F(X, Y) - Z_0|\,dX\,dY \quad \text{[Formula 1]}$$

F (X, Y): Surface shown by all measurement data $S_0$: Area when assumed that the designated surface is ideally flat $Z_0$: Mean value of Z data within the designated surface The designated surface means the area to be measured within a radius of 1 μm.

Now, as a preferable method for obtaining the toner particles used in the invention, a manufacturing method of the toner particles using surface modification process will be described. The surface modification apparatus used in the surface modification process and the manufacturing method of the toner particles using the surface modification process will be specifically described referring to the drawings.

Figure 2:
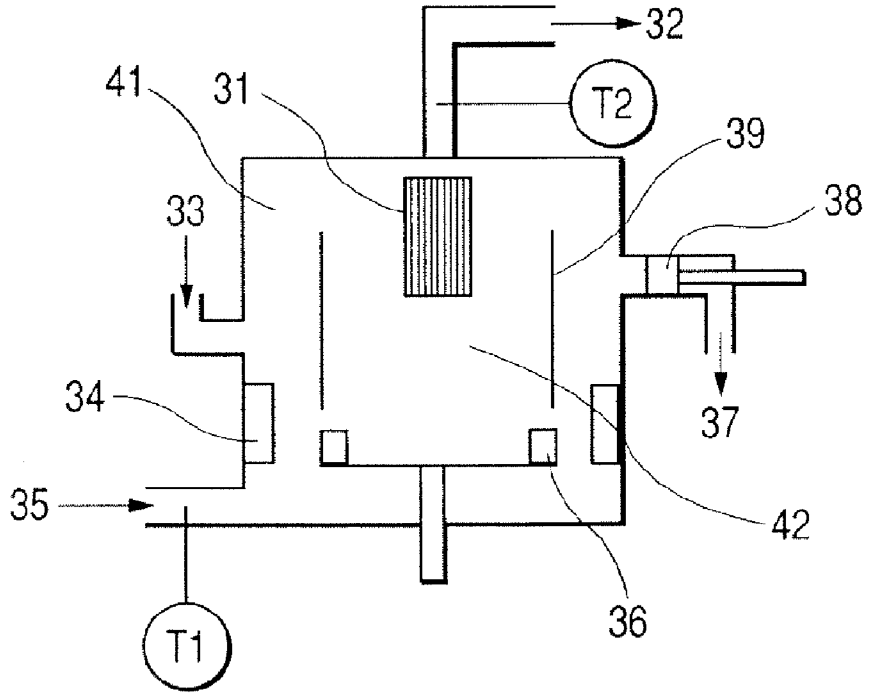
FIG. 2 is a compositional schematic section view of the modified surface of the apparatus of an example used in the surface modifying process of the toner particles used in the present invention.
Figure 3:
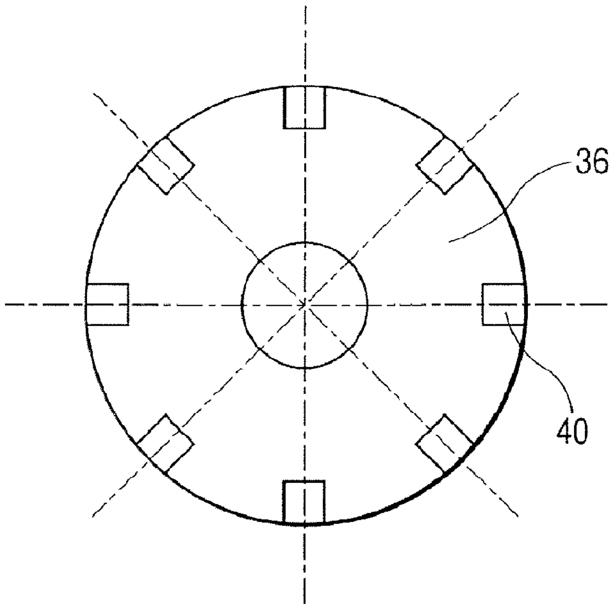
FIG. 3 is a compositional schematic view showing an example of the upper view of the dispersing rotor shown in FIG. 2.

FIG. 2 shows an example of the surface modification apparatus and FIG. 3 shows an example of the upper side view of the rotor (dispersion rotor) in FIG. 2 which rotates at high speed.

The surface modification apparatus shown in FIG. 2 which has the dispersion rotor 36 shown in FIG. 3 has a casing, a jacket (not shown) which can pass the cooling water or the antifreezing fluid and plural square type disks 40 or cylindrical pins 40 attached to the central rotation axis in the casing on the upper side and is composed of a dispersion rotor (surface modification measures) 36 which is a rotating body on the disk rotating at high speed, a linear 34 which is placed at specific intervals kept and has many grooves kept and has many grooves set on the surface (grooves on the surface of the linear are not required), further a classifying rotor 31 which is a means for classifying the surface-reformed ingredient into designated particles size, further a cool air introducing inlet 35 for introduction of cool air, the ingredient supplying inlet 33 for introduction of the ingredient to be treated, further discharging valve 38 established in the way that it can open and shut in order to enable to adjust the surface modification time freely, a powder discharging outlet 37 for discharging the treatment powder (toner particles), further the first space 41 for introducing the ingredient to be treated to the classifying means through the space among the classifying rotor 31, dispersion rotor 36 and liner 34, and a cylindrical guide ring 39 which is a guiding means for partition to form the second space 42 for introducing the particles (from which the fine powder has been classified and eliminated by the classifying rotor) to the surface modification zone. A gap between the dispersion rotor 36 and the liner 34 is the surface modification zone while the classifying rotor 31 and the part around the classifying rotor 31 is the classifying zone.

Setting direction of the classifying rotor 31 may be length wise or lateral as shown in FIG. 2. The number of the classifying rotor 31 may be single or plural as shown in FIG. 2.

In the surface modification apparatus, when the ingredient is fed from the ingredient supplying inlet 33 in the state that the discharging value 38 is opened, the ingredient fed is aspirated by the blower (not shown) and classified by the classifying rotor 31. In that time, the fine powder classified with the particles size of below the designated one is continuously discharged and eliminated outside the apparatus, whereas crude powder with the particles size of over the designated one is guided along the internal circumference of the guide ring 39 (the second space 42) by the centrifugal force on the circulating flow generated from the dispersing rotor 36 toward the surface modification zone. The ingredient particles introduced to the surface modification zone are subjected to the mechanical impact between the dispersing rotor 36 and liner 34 to be subjected surface modification treatment. The surface-reformed particles the surface of which is reformed are guided on the cool air passing in the apparatus along the external circumference of the guide ring 39 (the first space 41) to the classifying zone. The fine powder is discharged outside the apparatus by the classifying rotor 31 whereas the crude powder on the circulating flow is returned to the surface modification zone again to be subjected to surface modification action repeatedly. After a lapse of the specific time, the discharging value 38 is opened and from the discharging outlet 37, surface-reformed particles (toner particles) are collected.

In the surface modification process of the toner particles using the surface modification apparatus, the fine powder can be eliminated at the same time as surface modification of the toner particles. Therefore, the toner particles which have desired circularity, average surface roughness and superfine particles amount can be obtained effectively without adhesion of the superfine particles present in the toner onto the surface of the toner. On the other hand, in the case that the fine powder can not be eliminated at the sane time as surface modification, much amount of the superfine particles in the toner after surface modification is present, besides, the superfine particles component is adhered to the surface of the toner particles which have appropriate particles size due to mechanical and thermal effect during the surface modification process. As a result, projections owing to the adhering fine powder component are generated on the surface of the toner particles and it is difficult to obtain the toner particles which have desired circularity and average surface roughness.

For manufacturing method of the toner particles, it is preferable that fine and crude powder is eliminated to some extent from the toner particles of ingredient which have been made to fine particles with around the desired particles size in advance using an air flow type classifier surface modification of the toner particles by surface modification apparatus and elimination of superfine powder component are performed. Elimination of fine powder in advance gives good dispersion of the toner grins in the surface modification apparatus. Particularly, the toner particles of not less than 0.6 μm to less than 3 μm has large specific surface area and has relatively high frictional charging amount compared to other large toner particles, consequently it is difficult to separate the superfine powder component from the toner particles and the superfine powder component may not be classified properly by the classifying rotor. By elimination of fine powder in the toner particles ingredient in advance, individual toner gains disperse easily in the surface modification apparatus, superfine powder component is properly classified by the classifying rotor to give the toner which has a desired particles size distribution. For the toner from which the fine powder has been eliminated by the air flow type classifier, cumulative value of number-average size distribution of the toner particles smaller than 4 μm in size is not fewer than 10 particles % to fewer than 50 particles %, preferably not fewer than 15 particles % to fewer than 45 particles %, more preferably not fewer than 15 particles % to fewer than 40 particles % in particles size distribution as measured using the Coulter Counter method and the superfine powder component can be eliminated effectively by the surface modification apparatus. The air flow type classifier used in the invention includes Elbo Jet (Japan Iron Industry Co., Ltd.-made).

In the invention, rate of the particles of not less than 0.6 μm to less than 3 μm in the toner can be controlled to more proper value by controlling rpm of the dispersing rotor and classifying rotor in the surface modification apparatus.

Types of the binder resin used for the toner used in the invention include styrene, styrene copolymer, polyester, polyol, polyvinyl chloride, phenol, natural modified phenol, natural resin modified maleate, acryl resins, methacryl, polyvinylacetate, silicone, polyurethane, polyamide, furan, epoxy, xylene, polyvinylbutyral, terpene, chromanindene or petroleum resins.

The toner of the present invention preferably contains charging controller.

Those which control the toner to negative electrification are as follows.

For example, organo metallic complexes and chelate compound are effective, further there are monoazometallic complexes, metallic complexes of acetylacetone and metallic complexes of aromatic hydroxycarboxylic acids and aromatic dicarboxylic acids. Alternatively, there are aromatic hydroxycarboxylic acids, aromatic mono- and polycarboxylic acids and metal salts, anhydrides and esters thereof, and phenol derivatives such as bisphenol.

The toner used in the invention may contain waxes. The waxes used in the invention include the followings. For example, there are paraffin wax and derivatives thereof, montan wax and derivatives thereof, microcrystalline wax and derivatives thereof, Fisher-Tropsh wax and derivatives thereof, polyolefin wax and derivatives thereof, carnauba wax and derivatives thereof. Their derivatives comprises block copolymers of oxides with vinylic monomers and graft modified substances.

The toner used in the invention is preferably a magnetic toner containing a magnetic material. The magnetic material may serve also as a role of a coloring agent. The magnetic materials used for the toner include iron oxides such as magnetite, hematite and ferrite; alloy with metals such as iron, cobalt, nickel or aluminum, cobalt, copper, magnesium, tin, zinc, antimony, beryllium, bismuth, cadmium, calcium, manganese, selenium, titanium, tungsten and vanadium with these metals and a mixture thereof.

Other coloring agents which may be used for the toner in the invention include any appropriate pigments or dyes. The pigments include carbon black, aniline black, acetylene black, naphthol yellow, Hansa yellow, rhodamine lake, alizarin lake, Indian red, phthalocyanine blue, and indanthlene blue.

To the toner particles used in the invention, inorganic fine powder or hydrophobic inorganic fine powder are preferably added. For example, they include silica fine powder, titanium oxide fine powder or hydrophobic compounds thereof. They are preferably used alone or together.

The silica fine powder includes both dry silica referred to as fumed silica produced by vapor phase oxidation of silicon halogenides using the dry method and wet silica manufactured from liquid glass. Of them, the dry silica is preferable because silanol groups in or on the surface are less and no manufacturing residue.

Further, the silica fine powder is preferably those which are performed with hydrophobic treatment. Performing the hydrophobic treatment is done by reaction with silica fine powder or chemical treatment using organosilicon compounds adsorbed physically. The preferred methods include methods which are treated with organosilicon compounds such as silicone oil after dry silica produced by vapor phase oxidation of silicon halogenides is treated with silane compounds, or during treatment with silane compounds at the same time.

To the toner particles used in the invention, other additives except silica fine powder or titanium oxide fine powder may be added.

For example, they are an auxiliary for electrification, fluidity-giving agent, caking protecting agent, releasing agent at thermal rolling fixation, lubricant, resin fine particles or inorganic fine particles acted as an abrasive.

Weight average particle size or particle distribution of the toner is conducted using the Coulter Counter method. For example, Coulter multisizer (made by Coulter Co., Ltd.) can be used. Aqueous 1% NaCl solution of the electrolyte is prepared using first grade NaCl. Foe example, ISOTON R-II (made by Coulter Scientific Japan Co., Ltd.) may be used. As a measuring method, into 100 to 150 ml of the said aqueous electrolyte solution, 0.1 to 5 ml of a surfactant (preferably alkylbenzenesulfonates) is added, further 2 to 20 mg of a measuring sample is added. The electrolyte solution wherein the sample is suspended is treated for dispersion for about 1 to 3 minutes using an ultrasonic dispersing apparatus, then the volume and number of the toner particles of not less than 2.00 μm are measured using 100 μm aperture as an aperture from the measuring apparatus to calculate the volume distribution and number distribution. Then, the weight-average particle size (D4) is calculated based on the weight standard estimated from the volume distribution of the toner and the toner particles. The channel use the following 13 channels: 2.00 to less than 2.52 μm; 2.52 to less than 3.17 μm; 3.17 to less than 4.00 μm; 4.00 to less than 5.04 μm; 5.04 to less than 6.35 μm; 6.35 to less than 8.00 μm; 8.00 to less than 10.08 μm; 10.08 to less than 12.70 μm; 12.70 to less than 16.00 μm; 16.00 to less than 20.20 μm; 20.20 to less than 25.40 μm; 25.40 to less than 32.00 μm; and 32.00 to less than 40.30 μm.

Figure 4:
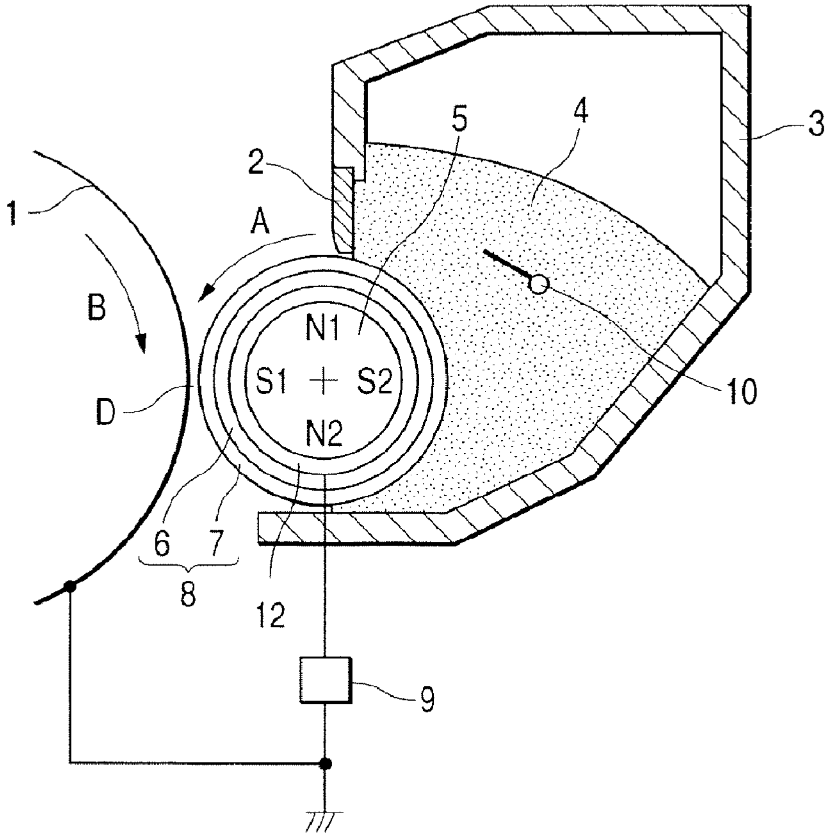
FIG. 4 is a schematic view showing one embodiment of the developing apparatus when using a magnetic one-component developer.

A developing apparatus having the developer carrying member of the invention, an image formation apparatus having the developing apparatus and a process cartridge will be described. FIG. 4 is a schematic view showing one embodiment of the developing apparatus having the developer carrying member of the invention when using a magnetic one-component developer as a developer. In FIG. 4, an electrophotographic photoconductive drum (photoconductive device for electrophotograph) 1 as an electrostatic latent image carrier retaining an electrostatic latent image which is formed by known processes is rotated to arrow B direction.

The developing sleeve 8 as the developer carrying member is placed such that they are opposed to the electrophotographic photosensitive drum 1 with a specific space. This developing sleeve 8 carries the one-component developer 4 which has the magnetic toner supplied from hopper 3 as the developer container and rotate toward the direction of the arrow to convey the developer 4 to the developing region D which is the closest part opposed to the developing sleeve on the surface of the photosensitive drum 1. As shown is FIG. 4, the magnet roller 5 which has a magnet built-in is placed to attract the developer 4 onto the developing sleeve 8 and maintain it.

The inventive developing sleeve 8 used in the developing apparatus has an electroconductive resin-coated larger as a resin-coated layer on the mental cylindrical tube 6 as a substrate. In the hopper 3, a stirring blade 10 is set to stir the developer 4. 12 is a space showing that the developing sleeve 8 and the magnetic roller 5 are not in contract with each other.

Figure 5:
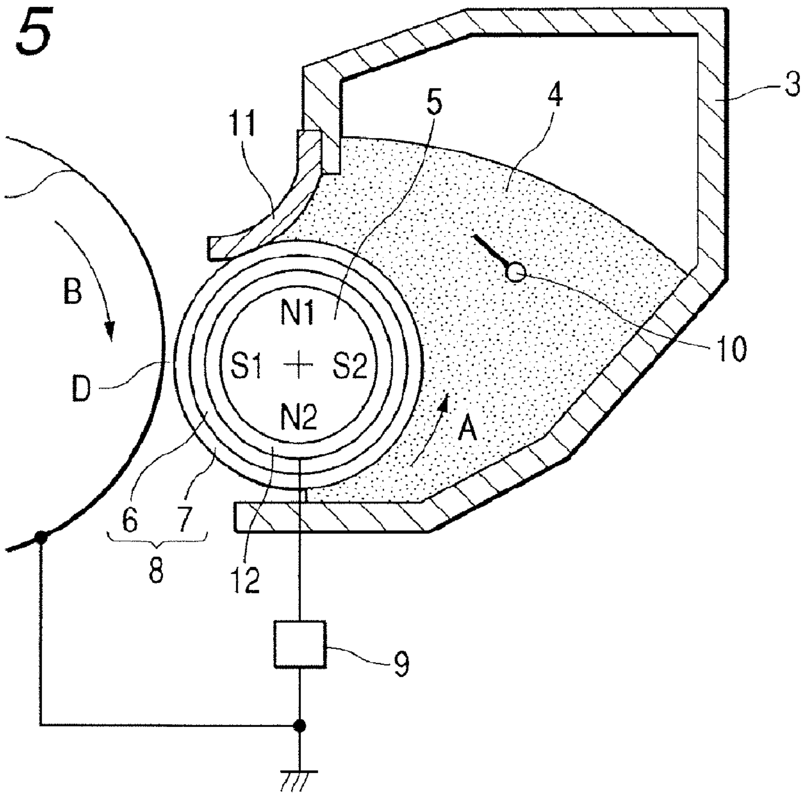
FIG. 5 is a schematic view showing other embodiment of the present invention.

The developer 4 obtains frictionally electrificated charge by friction between each magnetic toner and friction with the electroconductive resin-coated layer 7 on the developing sleeve 8 and the charge enables development of the electrostatic latent image which is on the photosensitive drum 1. In FIG. 5, the magnetic controlling blade 2 made from highly magnetic metal as the developer layer's thickness controlling member is hanged down from the hopper 3 such that it faces onto the developing sleeve 8 with a gap width of about 50 to 500 μm from the surface of the developing sleeve 8 to form a layer of the developer 4 to be conveyed to the developing region D as well as control the thickness of the layer. A thin layer of the developer 4 is formed on the developing sleeve 8 because of concentration of magnetic lines from the magnetic pole N1 of the magnetic roller 5 to the magnetic controlling blade 2. In the present invention, a nonmagnetic blade maybe also used in place of the magnetic controlling blade 2. The thickness of the thin layer of the developer 4 which is formed on the developing sleeve 8 in this manner is preferably even thinner than the minimum space between the developing sleeve 8 and the photosensitive drum 1 in the developing region D.

The developer carrying member of the present invention is particularly effective when incorporated into the noncontact type developing apparatus which uses the method of developing the electrostatic latent image with the above described thin layer of the developer. The developer carrying member of the present invention can be also applied to the contact type developing apparatus wherein thickness of the developer layer is not less than the minimum space between the developing sleeve 8 and the photosensitive drum 1 in the developing region D. An example of the noncontact type developing apparatus will be described as follows.

The developing bias voltage is applied to the developing sleeve 8 from the developing bias power source 9 as a bias means to fly the one-component developer 4 which has the magnetic toner carried on the developing sleeve 8. When using direct current voltage as the developing bias voltage, the voltage of medium value between the electrical potential of the electrostatic latent image part (the visualized region by attachment of the developer 4) and the background potential is preferably applied to the developing sleeve 8. In order to increase the developed image density or to improve gradation, alternating bias voltage may be applied to the developing sleeve 8 to form oscillating electric field reversing the direction alternately in the developing region D. In this case, alternating bias voltage which is accumulation of the direct current voltage component having the medium value between the electrical potential of the above described developing image part and the background potential is preferably applied to the developing sleeve 8.

In the case of normal development wherein the toner is attached to the high potential part of the electrostatic latent image, which has the high potential part and the low potential part to form the toner image, used is the toner which charges the polarity counter to the polarity of the electrostatic latent image. In the case of reverse development wherein the toner is attached to the low potential part of the electrostatic latent image, which has the high potential part and the low potential part to form the toner image, used is the toner which charges the polarity same as the polarity of the electrostatic latent image. The expression of high potential and low potential is based on the absolute value. In both cases, the developer 4 charges at least by friction with the developing sleeve 8.

Figure 6:
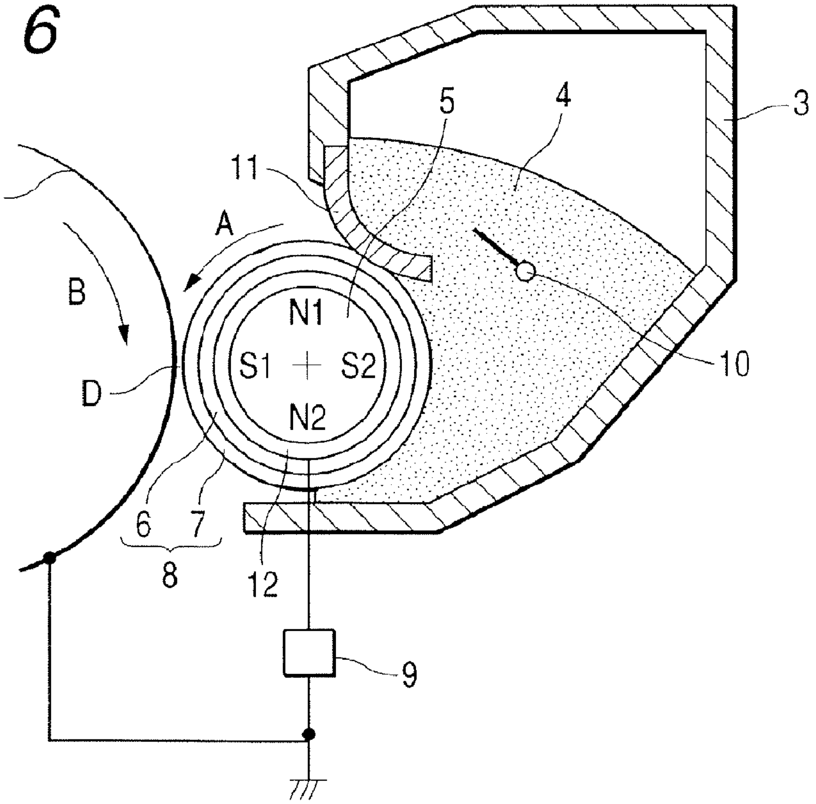
FIG. 6 is a schematic view showing other embodiment of the present invention.

FIG. 5 and FIG. 6 each is a compositional schematic view showing other embodiment of the inventive developing apparatus.

In the developing apparatuses shown in FIG. 5 and FIG. 6, as the developer layer thickness controlling member, used is an elasticity controlling blade (elasticity controlling member) 11 formed from the elastic plate of the material which has rubber elasticity such as urethane rubber and silicon rubber or the material which has metal elasticity such as phosphorus bronze and stainless steel. The developing apparatus in FIG. 5 is characterized in that the elasticity controlling blade 11 is closely pressed in the normal direction to the rotating direction of the developing sleeve 8 whereas the developing apparatus in FIG. 6 is characterized in that the elasticity controlling blade 11 is closely pressed in the reverse direction to the rotating direction of the developing sleeve 8. In those developing apparatuses, developer layer thickness controlling member is closely pressed to the developing sleeve elastically via the developer layer. Accordingly, the thin layer of the developer is formed on the developing sleeve, consequently, even thinner developer layer than that obtained by using the magnetism controlling blade described in FIG. 4 can be formed on the developing sleeve 8.

For the developing apparatus in FIG. 5 and FIG. 6, other basic constitution is the same as that shown in FIG. 4 and the same mark represents basically the same member.

FIG. 4 to FIG. 6 illustrate the developing apparatuses schematically needless to say that there are various altered forms for shape of developer container (hopper 3), presence or absence of stirring blade 10, configuration of the magnetic pole.

The present invention will be described in detail using examples and comparative examples, but the present invention is not at all limited to the present examples. "%" and "part(s)" in the examples and comparative examples are all based on weight unless otherwise noted.

Example of Manufacturing Graphitized Particles A-1

Bulk mesophase pitch was obtained as an ingredient for the graphitized particles as follows: β-resin was extracted from coal tar pitch by solvent fractionation, β-resin was treated to be heavier by hydrogenation, then the fraction soluble in the solvent was removed with toluene to give the bulk mesophase pitch. This bulk mesophase pitch was finely pulverized and the finely pulverized bulk mesophase pitch was treated to be oxidized at about 300° C. in the air, then subjected to the first burning at 1200° C. under the nitrogen atmosphere to be carbonized subsequently subjected to the second burning at 3000° C. under the nitrogen atmosphere to be graphatized, further classified to give the graphitized particles A-1 having 3.1 μm of the number-average particles size. Physical properties of the graphitized particles A-1 are shown in Table 1.

Example Of Manufacturing Graphitized Particles A-2 to A-5

The graphitized particles A-2 to A-5 were manufactured similarly to the example of manufacturing graphitized particles A-1 except that the burning temperature and particles size of bulk mesophase pitch of ingredient used were altered. The physical properties of the graphitized particles A-2 to A-5 obtained are shown in Table 1, respectively.

Example of Manufacturing the Graphitized Particles A-6

The meso carbon microbead was obtained as an ingredient of the graphitized particles as follows: a coal heavy oil was thermally treated and the crude meso carbon microbeads were centrifuged. The crude meso carbon microbeads obtained were washed with benzene, purified and dried, then they were dispersed mechanically with an atomizer mill to give the meso carbon microbeads. These meso carbon microbeads were subjected to the first burning at 1200° C. under the nitrogen atmosphere to be carbonized. The carbonized meso carbon microbeads were subjected to the second dispersion with an atomizer mill, subsequently to the second burning at 2800° C. under the nitrogen atmosphere to be graphitized, then further classified to give the graphitized particles A-6 having 3.4 μm of the number-average particles size. Physical properties of the graphitized particles A-6 are shown in Table 1.

Example of Manufacturing the Graphitized Particles A-7

As an ingredient of the graphitized particles, a mixture of coke and tar pitch was used. The mixture was kneaded at a temperature higher than the softening point of the tar pitch, then extrusion molding was performed to form the particles which were subjected to the first burning at 1000° C. under the nitrogen atmosphere to be carbonized, subsequently coal tar pitch was impregnated, then the particles were subjected to the second burning at 280° C. under the nitrogen atmosphere to be graphitized, further pulverized and classified to give the graphitized particles A-7 having 7.7 μm of the number-average particles size. Physical properties of the graphitized particles A-7 are shown in Table 1.

Example of Manufacturing Graphitized Particles A-8 to A-9

The graphitized particles A-8 to A-9 were manufactured similarly to the example of manufacturing graphitized particles A-1 except that the burning temperature and particles size of bulk mesophase pitch of ingredient used were altered. The physical properties of the graphitized particles A-8 to A-9 obtained are shown in Table 1, respectively.

TABLE 1

| | | Physical Property of Graphitized Particles Used in Resin-coated layer | | | |
|---|---|---|---|---|---|
| Type of Particles | Ingredient | Burning Temperature | Volume Average Particles Size (μm) | Lattice Spacing (Å□) d(002) | Graphitizing Degree p(002) |
| A-1 | Bulk mesophase pitch particles | 3000 | 3.1 | 3.3664 | 0.38 |

TABLE 1-continued

| Type of Particles | Ingredient | Burning Temperature | Volume Average Particles Size (μm) | Lattice Spacing (Å□) d(002) | Graphitizing Degree p(002) |
|---|---|---|---|---|---|
| | Physical Property of Graphitized Particles Used in Resin-coated layer | | | | |
| A-2 | Bulk mesophase pitch particles | 3000 | 2.2 | 3.3685 | 0.41 |
| A-3 | Bulk mesophase pitch particles | 3000 | 6.4 | 3.3623 | 0.31 |
| A-4 | Bulk mesophase pitch particles | 3300 | 3.3 | 3.3585 | 0.23 |
| A-5 | Bulk mesophase pitch particles | 2200 | 3.4 | 3.4077 | 0.79 |
| A-6 | Meso carbon micro beads | 3000 | 3.4 | 3.3645 | 0.35 |
| A-7 | Coke and tar pitch | 2800 | 7.7 | 3.3546 | 0.08 |
| A-8 | Bulk mesophase pitch particles | 1900 | 6.3 | 3.4470 | 1.04 |
| A-9 | Bulk mesophase pitch particles | 3000 | 9.2 | 3.3651 | 0.36 |

Manufacturing Example of Roughing Particles B-1

Onto 100 parts of sphere phenol resin particles having volume-average particles size of 13.5 μm, 14 parts of coal bulk mesophase pitch powder having volume-average particles size of not more than 2 μm was homogeneously coated using an automatic agate mortor (from Ishikawa Factory), then after thermal stabilization treatment was conducted at 280° C. in air, it was burned at 1900° C. under nitrogen atmosphere, further it was classified to be separated, thereafter roughing particles B-1 comprising sphere electroconductive carbon particles having volume-average particles size of 14.4 μm was obtained. The physical properties of roughing particles B-1 is shown in Table 2.

Manufacturing Examples of Roughing Particles B-2 to B-5

Except that the particles size of sphere phenol resin particles used was changed, roughing particles B-2 to B-5 were prepared using the same method as manufacturing example of roughing particles B-1. Each physical property of roughing particles B-2 to B-5 obtained is shown in Table 2.

TABLE 2

| Type of Particles | Material | Volume Average Particles Size (μm) | Average Circularity SF-1 |
|---|---|---|---|
| | Physical Property of Roughing Particles Used in the Resin-coated layer | | |
| B-1 | Carbon particles | 14.4 | 0.89 |
| B-2 | Carbon particles | 8.7 | 0.88 |
| B-3 | Carbon particles | 18.8 | 0.90 |
| B-4 | Carbon particles | 6.1 | 0.86 |

TABLE 2-continued

| Type of Particles | Material | Volume Average Particles Size (μm) | Average Circularity SF-1 |
|---|---|---|---|
| | Physical Property of Roughing Particles Used in the Resin-coated layer | | |
| B-5 | Carbon particles | 22.6 | 0.91 |

Preparation of Coating Intermediate C-1

| | |
|---|---|
| Resol type phenol resin solution manufactured using ammonia as a catalyst (containing 50% methanol) | 200 parts |
| Graphitized particles (A-1) | 135 parts |
| Isopropyl alcohol | 200 parts |

To the above materials, zirconia beads of 0.5 mm in diameter were added as media particles and dispersed by a longitudinal type sand mill to give coating intermediate C-1. Graphitized particles A-1 dispersed in the coating intermediate C-1, as shown in Table 3, is dispersed in the volume-average particles size of 1.7 μm, and volume-cumulative distribution of not less than 10 μm was 0%.

Preparation of Coating Intermediates C-2 to C-9

Except that each of graphitized particles A-2 to A-9 was used in place of the graphitized particles A-1, coating intermediates C-2 to C-9 were obtained using the same method as that of coating intermediates C-1. Constitution and distribution of volume-particles size of coating intermediates are shown in Table 3.

TABLE 3

Prescription and Physical Properties of Coating Intermediate

| Type of Coating Intermediate | Composition of Coating Intermediate: Graphitized Particles | Composition of Coating Intermediate: Binder Resin | Composition of Coating Intermediate: Solvent | Distribution of Volume Particles Size of Dispersed Graphitized Particles: Volume Average Particles Size (μm) | Distribution of Volume Particles Size of Dispersed Graphitized Particles: Volume Cumulative Distribution for 10 μm or More (%) |
|---|---|---|---|---|---|
| C-1 | A-1 135 parts | Phenol (containing methanol 50%) resin 200 parts | IPA 200 parts | 1.7 | 0.0 |
| C-2 | A-2 135 parts | Phenol (containing methanol 50%) resin 200 parts | IPA 200 parts | 1.0 | 0.0 |
| C-3 | A-3 135 parts | Phenol (containing methanol 50%) resin 200 parts | IPA 200 parts | 3.6 | 1.5 |
| C-4 | A-4 135 parts | Phenol (containing methanol 50%) resin 200 parts | IPA 200 parts | 1.6 | 0.0 |
| C-5 | A-5 135 parts | Phenol (containing methanol 50%) resin 200 parts | IPA 200 parts | 2.5 | 0.0 |
| C-6 | A-6 135 parts | Phenol (containing methanol 50%) resin 200 parts | IPA 200 parts | 1.8 | 0.0 |
| C-7 | A-7 135 parts | Phenol (containing methanol 50%) resin 200 parts | IPA 200 parts | 3.1 | 3.2 |
| C-8 | A-8 135 parts | Phenol (containing methanol 50%) resin 200 parts | IPA 200 parts | 3.9 | 3.4 |
| C-9 | A-9 135 parts | Phenol (containing methanol 50%) resin 200 parts | IPA 200 parts | 5.9 | 10.3 |

Preparation of Developer Carrying Member E-1

| | |
|---|---|
| Resol type phenol resin solution manufactured using ammonia as a catalyst (containing 50% methanol) | 100 parts |
| Electroconductive carbon black | 15 parts |
| Roughing particles B-1 | 22.5 parts |
| Quaternary ammonium salt compound | 20 parts |
| Methanol | 50 parts |

To the above materials, glass beads of 1 mm in diameter were added as media particles and dispersed by a longitudinal type sand mill to give a dispersion.

To 207.5 parts of the above dispersion, 535 parts of the coating intermediate C-1 were mixed, further methanol was added to give application solution 1 having 32% concentration of the solid part.

The resin-coated layer was formed on a grind-processed aluminum cylinder of 20 mm in outer diameter and average roughness of center line: Ra=0.3 μm, by the air-spray method using this application solution 1, subsequently the resin-coated layer was cured by heating at 150° C. for 30 minutes in a hot air dry furnace to prepare the developer carrying member E-11 The prescription and physical property resin-coated layer of developer carrying member E-1 obtained are shown in Table 4.

Preparation of Developer Carrying Members E-2 to E-3

In preparation of the developer carrying member E-1, except that the addition amount of roughing particles B-1 was changed from 22.5 parts to 7.5 and 52 parts, developer carrying members E-2 and E-3 were prepared using the same method as developer carrying member E-1. The prescription and physical property of resin-coated layers of developer carrying members E-2 and E-3 obtained are shown in Table 4.

Preparation of Developer Carrying Members E-4 to E-5

In preparation of the developer carrying member E-1, except that the roughing particles B-1 was changed to B-2 and B-3, developer carrying members E-4 and E-5 were prepared using the same method as developer carrying member E-1. The prescription and physical property of resin-coated layers of developer carrying members E-4 and E-5 obtained are shown in Table 4.

Preparation of Developer Carrying Members E-6 to E-10

In preparation of the developer carrying member E-1, except that the coating intermediate C-1 was changed to C-2 to C-6, developer carrying members E-6 to E-10 were prepared using the same method as developer carrying member E-1. The prescription and physical property of resin-coated layers of developer carrying members E-6 to E-10 obtained are shown in Table 4.

Preparation of Developer Carrying Member E-11

In preparation of the developer carrying member E-1, except that concentration of the solid part in the application solution was set as 23% and further applied using a dipping application method, developer carrying member E-11 was prepared using the same method as developer carrying member E-1. The prescription and physical property of resin-coated layer of developer carrying member E-11 obtained are shown in Table 4.

Preparation of Developer Carrying Member E-12

In preparation of the developer carrying member E-1, except that the roughing particles B-1 was not added, developer carrying member E-12 was prepared using the same method as developer carrying member E-1. The prescription and physical property of resin-coated layer of developer carrying member E-12 obtained are shown in Table 4.

Preparation of Developer Carrying Members E-13 to E-14

In preparation of the developer carrying member E-1, except that the roughing particles B-1 was changed to B-4 and B-5, developer carrying members E-4 and E-5 were prepared using the same method as developer carrying member E-1. The prescription and physical property of resin-coated layers of developer carrying members E-13 and E-14 obtained are shown in Table 4.

Preparation of Developer Carrying Members E-15 to E-17

In preparation of the developer carrying member E-1, except that the coating intermediate C-1 was changed to C-7 to C-9, developer carrying members E-15 to E-17 were prepared using the same method as developer carrying member E-1. The prescription and physical property of resin-coated layers of developer carrying members E-15 to E-18 obtained are shown in Table 4.

Preparation of Developer Carrying Member E-18

In preparation of the developer carrying member E-6, except that concentration of the solid part in the application solution was set as 23% and further applied using a dipping application method, developer carrying member E-18 was prepared using the same method as developer carrying members E-6. The prescription and physical property of resin-coated layer of developer carrying member E-18 obtained are shown in Tables 4A and 4B.

TABLE 4-A

Prescription and Physical Properties for Resin-coated layer of Developer Carrying Member

| | Developer Carrying Member | Coating Intermediate Used in Resin-coated layer | Prescription of Resin-coated layer: Graphitized Particles (sheets) | | Coarse Particles (sheets) | | Electroconductive Particles (sheets) | | Charging Controller (sheets) | | Binder resin (sheets) | |
|---|---|---|---|---|---|---|---|---|---|---|---|---|
| Example 1 | E-1 | C-1 | A-1 | 135 | B-1 | 22.5 | (a) | 15 | (b) | 20 | (c) | 150 |
| Example 2 | E-2 | C-1 | A-1 | 135 | B-1 | 7.5 | (a) | 15 | (b) | 20 | (c) | 150 |
| Example 3 | E-3 | C-1 | A-1 | 135 | B-1 | 52 | (a) | 15 | (b) | 20 | (c) | 150 |
| Example 4 | E-4 | C-1 | A-1 | 135 | B-2 | 22.5 | (a) | 15 | (b) | 20 | (c) | 150 |
| Example 5 | E-5 | C-1 | A-1 | 135 | B-3 | 22.5 | (a) | 15 | (b) | 20 | (c) | 150 |
| Example 6 | E-6 | C-2 | A-2 | 135 | B-1 | 22.5 | (a) | 15 | (b) | 20 | (c) | 150 |
| Example 7 | E-7 | C-3 | A-3 | 135 | B-1 | 22.5 | (a) | 15 | (b) | 20 | (c) | 150 |
| Example 8 | E-8 | C-4 | A-4 | 135 | B-1 | 22.5 | (a) | 15 | (b) | 20 | (c) | 150 |
| Example 9 | E-9 | C-5 | A-5 | 135 | B-1 | 22.5 | (a) | 15 | (b) | 20 | (c) | 150 |
| Example 10 | E-10 | C-6 | A-6 | 135 | B-1 | 22.5 | (a) | 15 | (b) | 20 | (c) | 150 |
| Example 11 | E-11 | C-1 | A-1 | 135 | B-1 | 22.5 | (a) | 15 | (b) | 20 | (c) | 150 |
| Comparative Example 1 | E-12 | C-1 | A-1 | 135 | | — | (a) | 15 | (b) | 20 | (c) | 100 |
| Comparative Example 2 | E-13 | C-1 | A-1 | 135 | B-4 | 52 | (a) | 15 | (b) | 20 | (c) | 100 |
| Comparative Example 3 | E-14 | C-1 | A-1 | 135 | B-5 | 22.5 | (a) | 15 | (b) | 20 | (c) | 100 |
| Comparative Example 4 | E-15 | C-7 | A-7 | 135 | B-1 | 52 | (a) | 15 | (b) | 20 | (c) | 100 |
| Comparative Example 5 | E-16 | C-8 | A-8 | 135 | B-1 | 52 | (a) | 15 | (b) | 20 | (c) | 100 |
| Comparative Example 6 | E-17 | C-9 | A-9 | 135 | B-1 | 52 | (a) | 15 | (b) | 20 | (c) | 100 |
| Comparative Example 7 | E-18 | C-2 | A-2 | 135 | B-1 | 52 | (a) | 15 | (b) | 20 | (c) | 100 |

(a): Carbon black,
(b): Quaternary ammonium salt compound,
(c): Phenol resin

TABLE 4-B

Prescription and Physical Properties for Resin-coated layer of Developer Carrying Member

| | Forming Method of Resin-coated layer | B/A | Ra (μm) | Thickness of Film (μm) | Volume Resistivity (Ω · cm) |
|---|---|---|---|---|---|
| Example 1 | Air spray | 5.5 | 1.48 | 13.2 | 0.23 |
| Example 2 | Air spray | 5.3 | 1.04 | 12.4 | 0.20 |
| Example 3 | Air spray | 5.7 | 2.05 | 14.6 | 0.29 |
| Example 4 | Air spray | 6.0 | 1.08 | 12.0 | 0.21 |
| Example 5 | Air spray | 5.3 | 2.17 | 16.9 | 0.30 |
| Example 6 | Air spray | 4.7 | 1.40 | 13.1 | 0.17 |
| Example 7 | Air spray | 6.2 | 1.45 | 13.4 | 0.19 |
| Example 8 | Air spray | 5.6 | 1.49 | 13.3 | 0.21 |
| Example 9 | Air spray | 5.7 | 1.52 | 13.5 | 0.72 |
| Example 10 | Air spray | 5.6 | 1.47 | 13.6 | 0.22 |
| Example 11 | Dipping | 4.9 | 1.34 | 15.2 | 0.24 |
| Comparative Example 1 | Air spray | 5.3 | 0.50 | 13.0 | 0.23 |
| Comparative Example 2 | Air spray | 7.2 | 1.40 | 13.2 | 0.20 |
| Comparative Example 3 | Air spray | 5.6 | 2.61 | 17.5 | 0.30 |

TABLE 4-B-continued

Prescription and Physical Properties for Resin-coated layer of Developer Carrying Member

| | Forming Method of Resin-coated layer | B/A | Ra (μm) | Thickness of Film (μm) | Volume Resistivity (Ω · cm) |
|---|---|---|---|---|---|
| Comparative Example 4 | Air spray | 6.0 | 1.52 | 13.4 | 0.20 |
| Comparative Example 5 | Air spray | 6.3 | 1.48 | 13.1 | 2.40 |
| Comparative Example 6 | Air spray | 8.7 | 1.60 | 13.3 | 0.25 |
| Comparative Example 7 | Dipping | 4.2 | 1.25 | 15.6 | 0.24 |

Preparation of Developer 1

| | |
|---|---|
| Styrene-butyl acrylate-acrylic acid copolymer | 100 parts |
| Magnetic material | 95 parts |
| Monoazo iron complex | 2 parts |
| Paraffin wax | 4 parts |

The above mixture was premixed by a Henschel mixer, and then molten and kneaded by a twin screw extruder heated to 110° C., and the cooled mixture was coarsely crushed with a hammer mill to obtain a toner coarse crushed material. The obtained coarse crushed material was finely crushed by mechanical crushing using a mechanical crusher Turbo Mill (manufactured by Turbo Industries Co., Ltd.; surfaces of rotator and stator plated with chromium alloy containing chromium carbide), and the obtained fine crushed material was processed by a multi-division classification apparatus (Elbow Jet classification apparatus manufactured by Nittetsu Kogyo Co., Ltd.) using the Coanda effect to classify and remove fine and coarse powders at the same time. The weight average particle size ($D_4$) of the obtained raw material toner particles (middle powder), as measured by the Coulter Counter method, was 6.6 μm, and the accumulated value of the number average distribution of toner particles having particle sizes less than 4 μm was 25.2% by number. The raw material toner particles were processed by a surface modifying apparatus shown in FIG. 1 to modify the surface and remove fine powder. Through the process described above, a negative charge toner, in which the weight average particle size ($D_4$) as measured by the Coulter Counter method was 6.8 μm and the accumulated value of the number average distribution of toner particles with the size less than 4 μm was 18.1% by number, was obtained. The average circularity of toner particles with the size equal to or greater than 3 μm, as measured by FPIA 2100, was 0.957, and the ratio of particles with the size equal to or greater than 0.6 μm and less than 3 μm was 16.8% by number. Furthermore, the average surface roughness of the toner particles measured using a scanning probe microscope was 13.5 nm.

100 parts of the toner particles and 1.2 parts of hydrophobic silica fine powder treated with hexamethyl disilazane and then treated with dimethyl silicone oil were mixed together by a Henschel mixer to prepare a developer 1.

EXAMPLES 1 TO 11 AND COMPARATIVE EXAMPLES 1 TO 7

Then, the developer carrying member synthesized was used to make evaluations by the methods described below.

The developer carrying member synthesized was mounted on a laser beam printer Laser Jet 9000 (manufactured by Hewlett-Packard Co., Ltd.) having a developing apparatus shown in FIG. 6, and durability evaluation tests were conducted for 35,000 sheets while supplying the developer 1. For the control member used in the above developing apparatus, pressing conditions of the urethane blade used in Laser Jet 9000 were changed so that the line pressure per cm (g/cm) along the length of the developer carrying member was 30 g/cm (29.4 N/m), and the NE being a distance between the uppermost position in pressing (upstream in the rotational direction of the developer carrying member) and the blade free end was 1 mm, and the durability was evaluated.

Evaluation

Durability tests were conducted for evaluation items described below, and developer carrying members of Examples and Comparative Examples were evaluated.

Durability evaluations were made under the normal temperature and normal humidity (N/N) environment of 23° C./60% RH, the normal temperature and low humidity (N/L) environment of 23° C./5% RH, and the high temperature and high humidity (H/H) environment of 30° C./80% RH for evaluation of images such as image density, fogging, sleeve ghost, image stripes and halftone uniformity, the toner feeding rate (M/S) on the developer carrying member, abrasion resistance of the resin coated layer and toner melt-adhesion.

The evaluation results are shown in Tables 5-A, 5B, 6-A and 6-B.

(1) Image Density

A reflection densitometer RD 918 (manufactured by Macbes Co., Ltd.) was used to measure densities of the solid black portion in solid printing at 5 points, and the average value of the densities was defined as the image density.

(2) Fogging Density

The reflection factor (D1) of the solid white portion of a recording paper having an image formed thereon was measured, the reflection factor (D2) of a unused recording paper identical in shape to the recording paper used for image formation was measured, the values of D1-D2 were determined at 5 points, and the average value thereof was defined as the fogging density. The reflection factor was measured by TC-6DS (manufactured by Tokyo Denshcku Co., Ltd.).

(3) Sleeve Ghost

An arrangement was made such that the position of a developing sleeve obtained by developing an image with the solid white portion and the solid black portion neighboring each other would be situated at the developing position at the time of next rotation of the developing sleeve to develop a halftone image, and unevenness appearing on the halftone image was visually evaluated based on the following criteria.

A: no unevenness is observed.
B: little unevenness is observed.
C: unevenness is slightly observed but practicable.
D: unevenness causing a problem from a practical standpoint appears in one round of the sleeve.
E: unevenness causing a problem from a practical standpoint appears in two or more rounds of the sleeve.

(4) Halftone Uniformity (Haze and Belt-Like Unevenness)

The formed image was visually observed for haze unevenness and belt-like unevenness running in the direction of image formation, occurring in halftone, and evaluations were made based on the following criteria.

AA: uniform image
A: unevenness can be slightly observed with close observation, but can hardly be observed at a look.
B: haze or belt-like unevenness slightly appears but can be ignored.
C: haze or belt-like unevenness can be observed when viewed from a distance, but is practical
D: fishskined haze appears entirely, or belt-like unevenness can be clearly observed.
E: the density is low, and a belt of low density spreads over the entire surface.

(5) Image Streaks

White streaks flowing in the image forming direction that occur in halftones or black s-rips are evaluated by viewing observation of formed images with respect to the following classification:

A: No white streaks are observed;
B: A small number of white streaks are found with careful observation, but nothing with a glance;
C: A small number of white streaks are found in halftones, but nothing in black strips;
D: A number of white streaks are observed with still allowing actual use, in halftones, and a small number of white streaks are observed in black strips;
E: A large number of white streaks are observed in halftones, which makes it difficult for the actual use to be done, and a number of white streaks are observed in black strips with still allowing the actual use; and
F: A large number of white streaks are observed in the entire black strips, which make it difficult for the actual use to be done.

(6) Toner Delivery Rate (M/S)

Toner carried on the developing sleeve was collected by a metal cylindrical tube and a cylindrical filter attracting it, and then, from the weight M of toner collected by the metal cylindrical tube and the area S for attracting toner, toner weight per unit area M/S ($dg/m^2$) is calculated thereby obtaining the toner delivery rate (M/S).

(7) Wear Resistance of Resin Coated Layer

The arithmetic mean roughness (Ra) values of surfaces of developer carrying members and the amounts of scrape in film thickness of resin coated layers were measured before and after a durability test. In the measurement for developer carrying member after the durability test, toner melt-adhesion material on the surface of developer carrying member was removed by immersion in MEK solution and exposure to ultrasonics.

The amount of scrape of resin coated layer (film scrape) was measured using a laser dimension measurement device produced by KEYENCE Corporation. Using a controller LS-5500 and a sensor head LS-5040T, a sensor section is secured on the device with a sleeve securing jig and a sleeve moving mechanism mounted thereon, and the measurement was made from the mean value of outside diameters of the sleeve. The measurement was made for thirty points in thirty divisions in the longitudinal direction of the sleeve, and after a circumferential rotation of 90 degrees, further measurement was made for other thirty points (totally sixty points), thereby obtaining a mean value. The outside diameter of the sleeve before the coating of the surface coating layer was measure in advance; then, the outside diameter after the surface coating layer formation and then the outside diameter after the durability test were measured, so that the difference between them provides a coat film thickness and a amount of scrape.

(8) Toner Melt-Adhesion

The surface of developer carrying member after the durability test was measured using an ultra-depth feature measurement microscope produced by KEYENCE corporation with a power of 200, thereby evaluating the degree of toner melt-adhesion with respect to the following classification:

AA: A small number of toner melt material pieces consisting of fine particles are observed;
A: A certain number of toner melt material pieces consisting of fine particles are observed;
B: A certain number of toner melt material pieces that are formed in an elongated manner are observed in a circumferential direction;
C: Several toner melt material pieces in a fine streak form are observed in a circumferential direction;
D: Several toner melt material pieces in a relatively clear streak form are observed in a circumferential direction; and
E: A number of toner melt material pieces in a clear streak form are observed in a circumferential direction.

TABLE 5-A

Evaluation Results of Durability with Laser Jet 9000 (image density, fogging, sleeve ghost, scattering, homogeneity of half tone)

| | | Image Density | | Fogging | | Sleeve Ghost | | Image Streak | | Homogeneity of Half Tone | |
|---|---|---|---|---|---|---|---|---|---|---|---|
| | Environment | (a) | (b) | (a) | (b) | (a) | (b) | (a) | (b) | (a) | (b) |
| Example 1 | N/N | 1.47 | 1.42 | 0.7 | 1.5 | A | A | A | A | AA | AA |
| | H/H | 1.44 | 1.40 | 0.8 | 1.6 | A | A | A | A | AA | AA |
| | N/L | 1.51 | 1.43 | 1.2 | 2.1 | A | B | A | A | AA | A |

TABLE 5-A-continued

Evaluation Results of Durability with Laser Jet 9000 (image density, fogging, sleeve ghost, scattering, homogeneity of half tone)

| | | Image Density | | Fogging | | Sleeve Ghost | | Image Streak | | Homogeneity of Half Tone | |
|---|---|---|---|---|---|---|---|---|---|---|---|
| | Environment | (a) | (b) | (a) | (b) | (a) | (b) | (a) | (b) | (a) | (b) |
| Example 2 | N/N | 1.41 | 1.32 | 0.8 | 2.1 | A | B | A | A | AA | A |
| | H/H | 1.36 | 1.27 | 0.7 | 1.7 | A | C | A | C | AA | C |
| | N/L | 1.43 | 1.31 | 1.1 | 2.6 | A | B | A | B | AA | B |
| Example 3 | N/N | 1.50 | 1.44 | 1.2 | 1.8 | A | A | A | A | AA | AA |
| | H/H | 1.44 | 1.39 | 1.0 | 1.5 | A | B | A | B | A | B |
| | N/L | 1.50 | 1.44 | 1.6 | 2.3 | B | B | A | A | A | A |
| Example 4 | N/N | 1.43 | 1.35 | 0.7 | 2.0 | A | A | A | A | AA | A |
| | H/H | 1.38 | 1.32 | 0.6 | 1.7 | A | B | A | B | AA | B |
| | N/L | 1.45 | 1.33 | 1.2 | 2.4 | B | B | A | C | AA | B |
| Example 5 | N/N | 1.48 | 1.41 | 1.3 | 1.9 | A | B | A | A | AA | A |
| | H/H | 1.43 | 1.38 | 1.0 | 1.7 | B | B | A | B | A | B |
| | N/L | 1.49 | 1.43 | 1.8 | 2.3 | C | C | A | B | A | B |
| Example 6 | N/N | 1.45 | 1.38 | 0.8 | 1.8 | A | A | A | A | AA | A |
| | H/H | 1.43 | 1.36 | 0.7 | 1.6 | A | B | A | A | AA | A |
| | N/L | 1.49 | 1.37 | 1.2 | 2.4 | A | C | A | B | AA | B |
| Example 7 | N/N | 1.46 | 1.42 | 0.8 | 1.8 | A | A | A | A | AA | AA |
| | H/H | 1.43 | 1.38 | 1.0 | 1.6 | A | B | A | B | AA | A |
| | N/L | 1.49 | 1.37 | 1.4 | 2.3 | A | B | A | A | A | B |
| Example 8 | N/N | 1.48 | 1.41 | 0.6 | 1.6 | A | A | A | A | AA | AA |
| | H/H | 1.43 | 1.39 | 0.8 | 1.7 | A | A | A | A | AA | AA |
| | N/L | 1.50 | 1.42 | 1.3 | 2.2 | A | B | A | A | AA | A |
| Example 9 | N/N | 1.50 | 1.42 | 0.9 | 1.8 | A | B | A | A | AA | A |
| | H/H | 1.46 | 1.38 | 1.0 | 1.7 | A | B | A | B | AA | A |
| | N/L | 1.52 | 1.41 | 1.6 | 2.5 | B | C | A | C | A | B |
| Example 10 | N/N | 1.46 | 1.40 | 0.7 | 1.6 | A | A | A | A | AA | AA |
| | H/H | 1.44 | 1.39 | 0.8 | 1.7 | A | A | A | A | AA | AA |
| | N/L | 1.50 | 1.42 | 1.2 | 2.2 | A | A | A | A | AA | A |
| Example 11 | N/N | 1.46 | 1.40 | 0.8 | 1.6 | A | A | A | A | AA | AA |
| | H/H | 1.43 | 1.38 | 0.8 | 1.5 | A | B | A | B | AA | A |
| | N/L | 1.49 | 1.39 | 1.4 | 2.2 | A | A | A | B | AA | A |

(a) Initial,
(b) After 35 thousand sheets

TABLE 5-B

Evaluation Results of Durability with Laser Jet 9000 (image density, fogging, sleeve ghost, scattering, homogeneity of half tone)

| | | Image Density | | Fogging | | Sleeve Ghost | | Image Streak | | Homogeneity of Half Tone | |
|---|---|---|---|---|---|---|---|---|---|---|---|
| | Environment | (a) | (b) | (a) | (b) | (a) | (b) | (a) | (b) | (a) | (b) |
| Comparative | N/N | 1.21 | 0.85 | 0.6 | 1.9 | A | D | A | F | AA | C |
| Example 1 | H/H | 1.15 | 0.65 | 0.6 | 1.5 | B | E | A | F | AA | D |
| | N/L | 1.23 | 0.71 | 1.0 | 2.3 | B | E | A | E | A | E |
| Comparative | N/N | 1.45 | 1.25 | 1.3 | 2.4 | A | D | A | B | AA | A |
| Example 2 | H/H | 1.42 | 1.12 | 1.1 | 2.0 | A | C | A | D | AA | D |
| | N/L | 1.49 | 1.22 | 1.8 | 3.2 | B | D | A | D | AA | C |
| Comparative | N/N | 1.44 | 1.28 | 2.2 | 2.6 | D | B | A | B | A | B |
| Example 3 | H/H | 1.37 | 1.19 | 1.9 | 2.4 | C | D | A | D | B | C |
| | N/L | 1.50 | 1.32 | 3.0 | 3.7 | D | E | A | C | B | D |
| Comparative | N/N | 1.42 | 1.22 | 1.5 | 2.3 | B | C | A | C | AA | C |
| Example 4 | H/H | 1.28 | 0.97 | 1.3 | 2.0 | B | D | A | E | A | D |
| | N/L | 1.49 | 1.19 | 2.5 | 3.4 | B | D | A | E | A | E |
| Comparative | N/N | 1.48 | 1.32 | 1.4 | 2.4 | B | D | A | C | AA | B |
| Example 5 | H/H | 1.43 | 1.19 | 1.5 | 2.1 | B | E | A | E | A | D |
| | N/L | 1.47 | 1.18 | 2.4 | 3.2 | C | F | A | E | A | C |
| Comparative | N/N | 1.48 | 1.41 | 0.9 | 1.7 | A | A | A | B | AA | A |
| Example 6 | H/H | 1.43 | 1.39 | 1.2 | 1.6 | A | C | A | D | AA | D |
| | N/L | 1.50 | 1.42 | 1.5 | 2.4 | A | B | A | C | A | B |

TABLE 5-B-continued

Evaluation Results of Durability with Laser Jet 9000 (image density, fogging, sleeve ghost, scattering, homogeneity of half tone)

| | | Image Density | | Fogging | | Sleeve Ghost | | Image Streak | | Homogeneity of Half Tone | |
|---|---|---|---|---|---|---|---|---|---|---|---|
| | Environment | (a) | (b) | (a) | (b) | (a) | (b) | (a) | (b) | (a) | (b) |
| Comparative Example 7 | N/N | 1.42 | 1.30 | 0.7 | 2.2 | A | B | A | B | AA | A |
| | H/H | 1.39 | 1.15 | 0.8 | 2.0 | A | D | A | D | AA | D |
| | N/L | 1.45 | 1.20 | 1.3 | 3.2 | A | C | A | C | AA | B |

(a) Initial,
(b) After 35 thousand sheets

TABLE 6-A

Evaluation Results of Durability with Laser Jet 9000 (abrasion resistance, M/S, toner melt-adhesion)

| | | Abrasion Resistance | | | M/S dg/m$^2$) | | Toner |
|---|---|---|---|---|---|---|---|
| | Environment | (a) Ra (μm) | (b) Ra (μm) | (c) (μm) | (a) | (b) | Melt-adhesion |
| Example 1 | N/N | 1.48 | 1.41 | 1.6 | 1.65 | 1.55 | AA |
| | H/H | 1.48 | 1.35 | 2.0 | 1.61 | 1.47 | AA |
| | N/L | 1.48 | 1.41 | 1.3 | 1.69 | 1.56 | A |
| Example 2 | N/N | 1.04 | 0.95 | 2.1 | 1.32 | 1.16 | A |
| | H/H | 1.04 | 0.91 | 2.5 | 1.26 | 1.00 | C |
| | N/L | 1.04 | 0.95 | 1.9 | 1.36 | 1.06 | B |
| Example 3 | N/N | 2.05 | 1.94 | 1.5 | 1.98 | 1.84 | AA |
| | H/H | 2.05 | 1.90 | 1.9 | 1.93 | 1.75 | A |
| | N/L | 2.05 | 1.96 | 1.2 | 2.01 | 1.80 | A |
| Example 4 | N/N | 1.08 | 1.00 | 1.9 | 1.36 | 1.22 | A |
| | H/H | 1.08 | 0.97 | 2.3 | 1.29 | 1.06 | B |
| | N/L | 1.08 | 1.02 | 1.7 | 1.36 | 1.04 | C |
| Example 5 | N/N | 2.17 | 2.05 | 1.6 | 2.14 | 1.99 | AA |
| | H/H | 2.17 | 2.01 | 2.2 | 2.08 | 1.89 | A |
| | N/L | 2.17 | 2.07 | 1.3 | 2.17 | 2.01 | A |
| Example 6 | N/N | 1.40 | 1.32 | 1.9 | 1.59 | 1.48 | AA |
| | H/H | 1.40 | 1.29 | 2.2 | 1.54 | 1.38 | A |
| | N/L | 1.40 | 1.32 | 1.8 | 1.63 | 1.44 | B |
| Example 7 | N/N | 1.45 | 1.37 | 1.9 | 1.63 | 1.53 | AA |
| | H/H | 1.45 | 1.33 | 2.2 | 1.56 | 1.41 | A |
| | N/L | 1.45 | 1.39 | 1.7 | 1.66 | 1.52 | A |
| Example 8 | N/N | 1.49 | 1.40 | 1.7 | 1.67 | 1.56 | AA |
| | H/H | 1.49 | 1.35 | 2.1 | 1.62 | 1.46 | AA |
| | N/L | 1.49 | 1.40 | 1.2 | 1.70 | 1.56 | A |
| Example 9 | N/N | 1.52 | 1.48 | 1.4 | 1.68 | 1.54 | A |
| | H/H | 1.52 | 1.44 | 1.8 | 1.60 | 1.38 | B |
| | N/L | 1.52 | 1.48 | 1.1 | 1.74 | 1.50 | C |
| Example 10 | N/N | 1.47 | 1.40 | 1.7 | 1.64 | 1.54 | AA |
| | H/H | 1.47 | 1.34 | 2.1 | 1.60 | 1.46 | AA |
| | N/L | 1.47 | 1.42 | 1.3 | 1.70 | 1.57 | A |
| Example 11 | N/N | 1.34 | 1.28 | 1.5 | 1.53 | 1.42 | AA |
| | H/H | 1.34 | 1.23 | 1.9 | 1.49 | 1.34 | A |
| | N/L | 1.34 | 1.29 | 1.2 | 1.56 | 1.42 | A |

(a) Initial,
(b) After 35 thousand sheet,
(c) Scraped amounts

TABLE 6-B

Evaluation Results of Durability with Laser Jet 9000 (abrasion resistance, M/S, toner melt-adhesion)

| | Environment | Abrasion Resistance (a) Ra (μm) | (b) Ra (μm) | (c) (μm) | M/S dg/m²) (a) | (b) | Toner Melt-adhesion |
|---|---|---|---|---|---|---|---|
| Comparative | N/N | 0.50 | 0.42 | 2.4 | 0.98 | 0.74 | D |
| Example 1 | H/H | 0.50 | 0.40 | 2.8 | 0.91 | 0.59 | E |
| | N/L | 0.50 | 0.43 | 2.0 | 1.02 | 0.68 | F |
| Comparative | N/N | 1.40 | 1.32 | 1.9 | 1.60 | 1.39 | B |
| Example 2 | H/H | 1.40 | 1.23 | 2.3 | 1.49 | 1.18 | D |
| | N/L | 1.40 | 1.29 | 1.9 | 1.67 | 1.34 | D |
| Comparative | N/N | 2.61 | 2.40 | 2.2 | 2.78 | 2.45 | B |
| Example 3 | H/H | 2.61 | 2.23 | 2.4 | 2.59 | 2.15 | D |
| | N/L | 2.61 | 2.40 | 1.8 | 3.02 | 2.44 | C |
| Comparative | N/N | 1.52 | 1.33 | 2.5 | 1.67 | 1.41 | C |
| Example 4 | H/H | 1.52 | 1.23 | 3.5 | 1.55 | 1.15 | E |
| | N/L | 1.52 | 1.33 | 2.5 | 1.76 | 1.25 | D |
| Comparative | N/N | 1.48 | 1.42 | 1.6 | 1.68 | 1.44 | C |
| Example 5 | H/H | 1.48 | 1.35 | 2.1 | 1.55 | 1.19 | D |
| | N/L | 1.48 | 1.41 | 1.3 | 1.74 | 1.26 | D |
| Comparative | N/N | 1.60 | 1.51 | 1.8 | 1.77 | 1.61 | B |
| Example 6 | H/H | 1.60 | 1.42 | 2.4 | 1.70 | 1.44 | D |
| | N/L | 1.60 | 1.52 | 1.6 | 1.81 | 1.51 | C |
| Comparative | N/N | 1.25 | 1.17 | 1.8 | 1.48 | 1.24 | B |
| Example 7 | H/H | 1.25 | 1.10 | 2.2 | 1.44 | 1.12 | D |
| | N/L | 1.25 | 1.16 | 1.7 | 1.54 | 1.34 | C |

(a) Initial,
(b) After 35 thousand sheet,
(c) Scraped amounts

What is claimed is:

1. A developer carrying member for carrying a developer, comprising:

at least a substrate and a resin-coated layer formed on the surface of the substrate, wherein the developer carrying member is one that carries a one-component developer to visualize the electrostatic latent image carried by the electrostatic latent image carrying member, wherein the resin-coated layer contains at least a binder resin, graphitized particles, and roughing particles, wherein the graphitized particles have 0.20 to 0.95 of graphitization degree (p (002)), the graphitized particles have 0.5 to 4.0 μm of volume-average particle size in the resin-coated layer, and the roughing particles have 5.5 to 20.0 μm of volume-average particle size and not less than 0.75 of average circularity SF-1, wherein in the surface configuration of the resin-coated layer as measured by use of focusing optical laser, the volume (B) of a microtopographical region defined by a certain area (A) of the microtopographical region without convexity formed by the roughing particles meets the following relationship: $4.5 \leqq B/A \leqq 6.5$, and wherein the resin-coated layer has 0.9 to 2.5 μm of arithmetic mean roughness (Ra).

2. The developer carrying member according to claim 1, wherein the graphitized particles are obtained by graphitizing bulk mesophase pitch particles.

3. The developer carrying member according to claim 1, wherein the graphitized particles are obtained by graphitizing meso carbon microbead particles.

* * * * *

UNITED STATES PATENT AND TRADEMARK OFFICE

CERTIFICATE OF CORRECTION

PATENT NO. : 7,364,791 B2
APPLICATION NO. : 11/564336
DATED : April 29, 2008
INVENTOR(S) : Masayoshi Shimamura et al.

It is certified that error appears in the above-identified patent and that said Letters Patent is hereby corrected as shown below:

ON THE TITLE PAGE:
At Item (57), Abstract, line 9, “has” should read --have--.

COLUMN 1:
Line 57, “thin” should read --thinly--.

COLUMN 2:
Line 57, “much” should read --a large--.
Line 63, “much” should read --a large--.

COLUMN 3:
Line 45, “stabilize” should read --stabilizes--.

COLUMN 4:
Line 42, “has” should read --have--.
Line 61, “appear” should read --appears--.
Line 62, “particles” should read --particle--.

COLUMN 5:
Line 2, “give” should read --gives--.
Line 11, “occurring” should read --requiring--.

COLUMN 6:
Line 43, “differs” should read --differ--.
Line 51, “has” should read --have-- and, “similarly” should read --similar--.
Line 54, “is” should read --are--.
Line 57, “itself” should read --themselves--.

COLUMN 7:
Line 17, “it gives” should read --giving--.

COLUMN 8:
Line 51, “has” should read --have--.
Line 54, “soften and fuse” should read --softens and fuses--.

UNITED STATES PATENT AND TRADEMARK OFFICE
CERTIFICATE OF CORRECTION

PATENT NO. : 7,364,791 B2
APPLICATION NO. : 11/564336
DATED : April 29, 2008
INVENTOR(S) : Masayoshi Shimamura et al.

It is certified that error appears in the above-identified patent and that said Letters Patent is hereby corrected as shown below:

COLUMN 9:
Line 15, “contains” should read --contain--.
Line 19, “is” should read --are--.
Line 32, “perform” should read --performing a--.

COLUMN 10:
Line 17, “further” should read --and further--.
Line 58, “circularity,” should read --circularity--.
Line 60, “calculated” should read --calculate--.
Line 63, “particles” should read --particle--.

COLUMN 12:
Line 25, “is” should read --are--.

COLUMN 14:
Lines 57-58, “from homogenous of” should read --homogenous--.

COLUMN 15:
Line 8, “particles” should read --particle--.
Line 12, “reduce relatively.” should read --are relatively reduced.--.
Line 34, “particles” should read --particle--.

COLUMN 16:
Line 57, “berates” should read --borates--.

COLUMN 17:
Line 56, “followings.” should read --following.--.
Line 59, “$SO_3$” should read --$SO_3^-$--.

COLUMN 18:
Line 66, “$SO_3$” should read --$SO_3^-$--.

COLUMN 19:
Line 65, “$SO_3$” should read --$SO_3^-$--.

UNITED STATES PATENT AND TRADEMARK OFFICE

CERTIFICATE OF CORRECTION

PATENT NO. : 7,364,791 B2 
APPLICATION NO. : 11/564336
DATED : April 29, 2008
INVENTOR(S) : Masayoshi Shimamura et al.

It is certified that error appears in the above-identified patent and that said Letters Patent is hereby corrected as shown below:

COLUMN 20:
Line 39, "invention" should read --invention,--.
Line 49, "which" should read --which have a--.

COLUMN 21:
Line 26, "syrindrical" should read --cylindrical--.
Line 40, "is" should read --are--.
Line 54, "has" should read --have--.

COLUMN 23:
Line 3, "much" should read --a large--.
Line 14, "RH of humidity," should read --RH,--.

COLUMN 24:
Line 20, "particles" should read --particle--.
Line 36, "has" should read --have--.
Line 49, "particles" should read --particle--.
Line 56, "id" should read --is--.

COLUMN 25:
Line 7, "has" should read --have--.
Line 49, "Cc.," should read --Co.,--.

COLUMN 27:
Line 1, "length" should read --length- --.
Line 39, "sane" should read --same--.
Line 58, "grins" should read --grains--.

COLUMN 29:
Line 42, "use" should read --uses--.

COLUMN 33:
Line 32, "particles" should read --particle--.
Line 34, "ticles" should read -- -ticle--.
Line 40, "particles" should read --particle--.
Line 44, "particles" should read --particle--.

UNITED STATES PATENT AND TRADEMARK OFFICE

CERTIFICATE OF CORRECTION

PATENT NO. : 7,364,791 B2
APPLICATION NO. : 11/564336
DATED : April 29, 2008
INVENTOR(S) : Masayoshi Shimamura et al.

It is certified that error appears in the above-identified patent and that said Letters Patent is hereby corrected as shown below:

COLUMN 34:
Line 66, "particles" should read --particle--.

COLUMN 41:
Line 30, "s-rips" should read --strips--.

COLUMN 42:
Line 26, "measure" should read --measured--.
Line 30, "a" should read --an--.
Line 39, "are" should read --is--.
Line 41, "are" should read --is--.
Line 43, "are" should read --is--.
Line 51, "are" should read --is--.

Signed and Sealed this

Twenty-fourth Day of February, 2009

JOHN DOLL
*Acting Director of the United States Patent and Trademark Office*